(12) United States Patent
Witzens et al.

(10) Patent No.: US 12,339,498 B2
(45) Date of Patent: Jun. 24, 2025

(54) OPTICAL COUPLER COMPRISING A MOLDED OPTICAL INTERPOSER TOGETHER WITH A PIC AND 2 POLARIZATION SELECTIVE ELEMENTS ENABLING ISOLATION AND/OR POLARIZATION MANAGEMENT

(71) Applicant: Rheinisch-Westfälische Technische Hochschule (RWTH) Aachen, Aachen (DE)

(72) Inventors: Jeremy Witzens, Cologne (DE); Florian Merget, Würselen (DE)

(73) Assignee: Rheinisch-Westfälische Technische Hochschule (RWTH) Aachen (DE)

(*) Notice: Subject to any disclaimer, the term of this patent is extended or adjusted under 35 U.S.C. 154(b) by 226 days.

(21) Appl. No.: 17/802,345

(22) PCT Filed: Feb. 26, 2020

(86) PCT No.: PCT/EP2020/025095
§ 371 (c)(1),
(2) Date: Aug. 25, 2022

(87) PCT Pub. No.: WO2021/170200
PCT Pub. Date: Sep. 2, 2021

(65) Prior Publication Data
US 2023/0152537 A1     May 18, 2023

(51) Int. Cl.
*G02B 6/27* (2006.01)
*G02B 6/30* (2006.01)
*G02B 6/42* (2006.01)

(52) U.S. Cl.
CPC ........ *G02B 6/2706* (2013.01); *G02B 6/272* (2013.01); *G02B 6/2746* (2013.01); *G02B 6/30* (2013.01);
(Continued)

(58) Field of Classification Search
CPC ...... G02B 6/27; G02B 6/2706; G02B 6/2713; G02B 6/272; G02B 6/30; G02B 6/4204–4209; H01S 5/0064
See application file for complete search history.

(56) References Cited

U.S. PATENT DOCUMENTS 6,956,995 B1 * 10/2005 Shafaat ............... G02B 6/32
385/39
10,551,575 B2    2/2020 Roth et al.
(Continued)

FOREIGN PATENT DOCUMENTS

CN    106464383 A    2/2017
CN    106814425 A    6/2017
(Continued)

OTHER PUBLICATIONS

International Search Report including Written Opinion for Application No. PCT/EP2020/025095 mailed Nov. 17, 2020, pp. 1-17.
(Continued)

*Primary Examiner* — Michael Stahl
(74) *Attorney, Agent, or Firm* — Lerner David LLP

(57) ABSTRACT

The invention describes an apparatus that implements efficient coupling between a photonic integrated circuit (PIC) and a second optical element such as a fiber or laser, while at the same time allowing for efficient polarization management and/or optical isolation. It enables the packaging of PICs with large single mode fiber counts and in- and out-coupling of light with arbitrary polarization. The apparatus comprises a glass interposer that contains at least one polarization selective element together with a pair of lenses transforming a beam profile between the 2nd optical element and a polarization selective coupler on the PIC. The invention also comprises a method for fabricating the apparatus based on a subassembly of building blocks that are manu-
(Continued)

factured using wafer-scale high-precision glass-molding and surface treatment(s) such as thin-film coating.

13 Claims, 23 Drawing Sheets

(52) U.S. Cl.
CPC ......... *G02B 6/4208* (2013.01); *G02B 6/4213* (2013.01); *G02B 6/4246* (2013.01)

(56) References Cited

U.S. PATENT DOCUMENTS

| | | | | |
|---|---|---|---|---|
| 2012/0170111 | A1* | 7/2012 | Doerr | G02B 6/4204 |
| | | | | 264/1.25 |
| 2014/0153605 | A1* | 6/2014 | Arimoto | G02B 6/4219 |
| | | | | 372/50.11 |
| 2016/0246009 | A1* | 8/2016 | Jiang | G02B 6/124 |
| 2016/0327758 | A1* | 11/2016 | Morioka | B29C 45/0025 |
| 2016/0377811 | A1* | 12/2016 | Goodwill | G02B 6/34 |
| | | | | 385/24 |
| 2017/0019181 | A1 | 1/2017 | Flintham et al. | |
| 2017/0146736 | A1 | 5/2017 | Verslegers et al. | |
| 2017/0153391 | A1 | 6/2017 | Verslegers et al. | |
| 2017/0343739 | A1* | 11/2017 | Bauters | G02B 6/2766 |
| 2018/0364426 | A1 | 12/2018 | ten Have et al. | |
| 2019/0064457 | A1 | 2/2019 | Roth et al. | |
| 2019/0113687 | A1 | 4/2019 | Wang et al. | |
| 2019/0115995 | A1 | 4/2019 | Sahni et al. | |
| 2019/0258175 | A1 | 8/2019 | Dietrich et al. | |
| 2020/0132933 | A1* | 4/2020 | Mathai | G02B 6/2733 |
| 2021/0373232 | A1* | 12/2021 | Ishikawa | G02B 6/125 |
| 2024/0264380 | A1* | 8/2024 | Witzens | G02B 6/34 |

FOREIGN PATENT DOCUMENTS

| | | | |
|---|---|---|---|
| CN | 104838299 | B * | 12/2017 |
| CN | 107850743 | A | 3/2018 |
| CN | 109073842 | A | 12/2018 |
| CN | 109791255 | A | 5/2019 |
| CN | 109983381 | A | 7/2019 |
| JP | 2006-344915 | A * | 12/2006 |
| WO | 2019040765 | A1 | 2/2019 |

OTHER PUBLICATIONS

Search Report dated Feb. 26, 2025 from the Office Action for Chinese Application No. 202080100215.4 Issued Feb. 27, 2025, pp. 1-3.

* cited by examiner

OPTICAL COUPLER COMPRISING A MOLDED OPTICAL INTERPOSER TOGETHER WITH A PIC AND 2 POLARIZATION SELECTIVE ELEMENTS ENABLING ISOLATION AND/OR POLARIZATION MANAGEMENT

CROSS-REFERENCE TO RELATED APPLICATION

This application is a national phase entry under 35 U.S.C. § 371 of International Application No. PCT/EP2020/025095, filed Feb. 26, 2020, the entire disclosure of which is incorporated herein by reference.

BACKGROUND OF THE INVENTION

While legacy network topologies implement a tree like architecture in which data traffic between access nodes has to transit through several hierarchical layers, the topologies implemented in newer datacenters are typically based on a spine-leaf architecture connecting the top-of-the-rack (TOR) switches (leaf) with multiple or all spine nodes, significantly reducing latency and improving network reliability. Due to the resulting high port numbers and increased distances, also resulting from scaling up of the number of servers, these architectures require cost-effective high bandwidth optical interconnects over distances of 500 meters and more. Therefore, the industry is currently undergoing a paradigm change moving away from the conventional multimode vertical cavity surface emitting laser (VCSEL) technology towards single mode based optical technology. This facilitates the use of photonic integrated circuit (PIC) technology such as silicon photonics with complex optical circuits enabling e.g. wavelength division multiplexed or polarization multiplexed data encoding. 400 G transceivers with 100 Gb/s per carrier or per fiber as defined by the IEEE P802.3bs standard are being implemented using external modulation and PIC technology.

As a further trend, electronic-photonic co-packaging in datacenter switches is being actively investigated as a means to reduce electrical power consumption. This poses further optical packaging challenges as very large numbers of fibers have to be brought to a single package.

In the following, a PIC refers to a chip comprising optical components emitting or receiving light from or to the chip, and may refer to a chip containing waveguides connected to modulators, photodetectors, multiplexers or other on-chip optical devices. It may however also refer to a chip containing an array of surface emitting single mode VCSELs or large area detectors. The PIC may also be an electronic photonic integrated circuit (EPIC) comprising both photonic and electronic devices. In its most general form, a PIC may refer to any chip with photonic devices emitting or receiving light.

Efficient coupling of light between individual optical elements in single mode optical systems is a major challenge since it requires accurate spatial and angular alignment of the two components. Also, since standard single mode optical fibers do not maintain a predefined polarization and integrated components are usually more highly performant when designed for a single polarization, polarization management is another major challenge when assembling single mode optical systems. Lastly, laser used in optical systems typically require isolation from back-reflections to operate in a stable manner. Since isolators are typically implemented with discrete components assembled as part of the optical packaging, this creates further challenges for the latter.

In general, single mode fiber coupling technologies can be classified into three categories:
  Direct fiber coupling to a surface-emitting/receiving, mode-matched emitter or receiver;
  Direct fiber coupling to a mode-matched edge emitter or receiver;
  Indirect fiber coupling to a surface or edge emitter or receiver using imaging optics for mode conversion.

For the first 2 coupling technologies, the single mode fiber is directly coupled to an optical component such as a PIC. Mode matching is achieved e.g. by using mode-matched, surface emitting grating couplers or adiabatically tapered waveguides as edge couplers on the PIC. Interposed waveguide-based components that adiabatically transform the mode of the PIC to the fiber mode can also be used, in which case the coupling scheme can be conceptually seen as a series of direct coupling between several optical components. This coupling scheme is characterized by the light remaining guided inside the waveguides of the interposer, as opposed to propagating as a free beam not constrained by guiding in a waveguide (as is the case in the interposers described in the following). In these direct coupling schemes, the dimensions of the mode profiles are on the order of a few microns and the beam paths between elements are short and can even be of zero length when the optical components are directly attached to each other. The alignment tolerances scale with the mode profiles and can therefore reach a few microns when attaching a single mode optical fiber. However, other than transforming the mode, these coupling schemes do not add any optical functionality to the system. I.e., polarization splitting, wavelength filtering or routing, or optical isolation have to be implemented elsewhere in the optical system. If implemented on the PIC, on-chip polarization management may require duplication of components if the two polarizations are treated separately or may significantly increase the complexity of the optical system and the associated control system if the two polarizations are being combined on the PIC. In particular, recombining two arbitrary polarizations typically requires a photonic sub-circuit with at least two phase shifters. While applying control signals at system start-up to the two phase shifters so as to recombine the two polarizations is a tractable problem, as the polarization of the incoming light drifts over time, the phase shifters may run into their compliance limits, resulting in an unacceptable interruption of service.

The third approach is currently mainly used for high-priced medium to low volume products, for example in high-value telecom applications. Here, discrete optical elements, such as lens arrays, prisms, or polarizing beam splitters, are assembled on an optical bench subassembly that images (transforms) the optical mode of the emitting element, e.g. a laser diode, PIC, or optical fiber, to the optical mode of the receiving element, e.g. a photodiode, PIC, or optical fiber. Because of the stringent tolerances required for the alignment of the beam path and of the optical elements, polymer-based couplers used in multimode systems cannot be utilized in single mode optical systems while maintaining a reasonable yield. Also, because of the length of the beam path, the angular alignment tolerances of the individual elements are significantly more stringent and, with the current state-of-the-art assembly technology, only sequential active assembly of precision-made elements yields reasonable results. Such elements are typically made by grinding, polishing, or grey scale lithography followed by etching in order to maintain sufficient manufacturing precision. The complexity of the assembly process makes such coupling technology a major cost driver, currently restricting its commercial applicability to high-priced applications.

However, an external imaging system is compatible with the addition of further optical functionality such as polarization management, wavelength management, or optical isolation into the coupler subassembly. An important challenge is then to integrate as much functionality as possible in as few components as possible, and to keep extended free beam paths inside individual components instead of in-between individual components, so as to facilitate assembly.

Common fabrication technologies for the manufacturing of discrete optical components are:

High-precision grinding and polishing of individual components;

High-precision glass-molding of individual or multiple components;

High-precision etching using 3D, grey scale masking techniques.

While the first method yields the best results in terms of optical performance, it is also the most cost intensive and is only used for high priced applications such as large diameter lenses for astronomical systems. The last method is based on high resolution lithography and 3D resist exposure. It provides highest spatial resolution and allows for parallel manufacturing of multiple high-resolution optical elements such as optical gratings or lens arrays at the wafer scale. However, high resolution lithography usually requires a flat surface as a substrate. Also, manufacturing of a 3D surface such as a lens surface requires extensive process development and cannot be easily transferred to other geometries, the achievable range of which remains quite limited.

The high-precision molding technology combines the advantages of the other 2 fabrication technologies, both in terms of increased throughput and higher design flexibility. Here, a glass preform, typically a substrate in the shape of a flat wafer with optical grade top and bottom surface quality, is heated beyond the glass transition temperature ($T_a$) and then molded by compression between 1 or 2 molds that can be fabricated using high precision grinding, milling, and cutting, or a combination thereof, providing a very high shape accuracy as well as high flexibility in regards to the formed 3D surfaces. Since the molds can be reused up to a few thousand times and recoated with hardened materials to increase their lifetime, the cost overhead associated to precision grinding can be split over a very large number of molded preforms and fabricated parts.

Also, multiple instances of the same or of different geometries can be fabricated in parallel by a single molding process applied to a wafer shaped preform. Because glass molding is a replicative fabrication technology, it provides high throughput with several hundred thousand up to several millions of piece parts fabricated per year per production tool depending on the dimensions of the molded part. A large variety of glass substrates are available ranging from low-temperature glasses with a $T_c$ on the order of 450° C. up to pure silica-substrates with a $T_c$ of 1100° C., as well as a wide range of thermal expansion coefficients facilitating reliable assembly with other building blocks made of different materials. Two versions of the process exist: (1) The isothermal glass-molding, in which both the mold and the glass preform are pre-heated to the same temperature, and (2) the non-isothermal glass molding (NGM), in which only the glass preform is heated beyond the glass-transition temperature and the mold stays significantly cooler. This allows for a reduction of the process time and thereby a higher throughput than the isothermal-process. However, it is also more prone to temperature gradient induced tension and local shrinkage, making the process less accurate and potentially less reliable than the isothermal-process. While glass molding manufacturing technology has been used for a number of years for manufacturing lenses for applications such as lighting, it has only recently reached the level of accuracy and the resolution required for devices enabling single mode coupling. Even now, some dimensions such as the exact distance between the top and bottom molds, and thus the distance between the top and bottom surfaces of the molded part, remain critical and drive the overall tolerances of the manufactured part. Moreover, lenses can be manufactured with higher precision if their optical axis is along or at a small angle relative to the main axis of the press, i.e., in case of molding of a wafer shaped preform, if their optical axis is close to being perpendicular to the surface of the glass wafer. A range of +/−30° from that orientation typically remains manufacturable with good yield. These constraints and tolerances need to be incorporated into the interposer design in order to obtain useable parts. Nonetheless, this manufacturing scheme provides much more flexibility than grey-scale lithography, as other features such as reflective facets can be straightforwardly fabricated at the same time as lenses. This capability will be leveraged in the following to add functionality to the glass-molded interposers.

Functionalities such as polarization management or optical isolation require polarization selective elements that can be implemented on a glass-molded interposer in the form of polarization selective elements at boundaries of or between dielectric materials. Several classes of such polarization selective elements exist that affect the reflectivity or transmittivity of a boundary between two dielectric media (including air, vacuum and glass) in such a way that light is either transmitted, reflected, scattered or absorbed at the boundary depending on its polarization. In the following, these polarization selective elements will further be referred to as a polarization selective reflector if one polarization is reflected and the other transmitted or filtered out, and as polarization selective filters if one polarization is transmitted and the other filtered out.

1. Polarization selective elements based on metal surface gratings. An electric (E-)field that is oriented along the same axis as the grating induces an electric current in the metal lines and thereby results in significant absorption (filtered polarization), while an electric field oriented perpendicular to the orientation of the grating passes through with much reduced absorption (transmitted polarization). Careful engineering of the metal grating density and dimensions is required to have a sufficient contrast between the transmitted and the filtered polarizations. In particular, very fine and potentially costly lithography is required. As a significant advantage, the functionality of the polarizer is maintained over a wide range of wavelengths and incidence angles.

2. Polarization selective transmitting/reflecting elements based on a dielectric surface grating. The working principle of this kind of polarizer is based on the different scattering behavior of light depending on whether it has a parallel or a perpendicular electric field alignment with respect to the in-plane translation axis of the (1D) grating or relative to the lattice vectors of a 2D grating. While one polarization is scattered to the sides or reflected (filtered or reflected polarization), the other polarization is passed through (transmitted polarization). These kinds of polarizers require a very precise control of the grating dimensions within a few tens of nanometers and are usually optically narrowband. Also, the angle of incidence is typically limited to a narrow range.

3. Polarization selective transmitting/reflecting elements based on a typically multilayer dielectric thin-film stack, that either reflects (reflected polarization) or transmits (transmitted polarization) the light based on its polarization. These multi-layer stacks are easier to manufacture and are widely used in polarizing beam splitter cubes (PBS). They utilize the different reflection-coefficients at the interface of two dielectric materials that depend on whether the E-field is perpendicular (s-polarized) or parallel (p-polarized) relative to the plane of incidence. In particular, the reflection coefficient for p-polarized light goes to zero at the Brewster angle, defined as the incidence angle arctan(n'/n), wherein n is the refractive index of the dielectric material in which the light is incident/reflected and n' is the refractive index of the dielectric material in which the light is transmitted. The reflection of the s-polarization is improved by having multiple dielectric boundaries with the associated individual reflections constructively adding up. This can be used to design a thin film stack letting the p-polarization through and reflecting the s-polarization. These polarizers therefore require a tilted angle of incidence relative to the surface-normal of the layer stack. The reflection of the s-polarized light is enhanced by stacking multiple layers, trading off reduced optical bandwidth for enhanced contrast between the transmitted and reflected polarizations. This configuration, also referred to as the MacNeille configuration, is used in Brewster angle polarizing beam splitters. As a disadvantage, if a specific angle of incidence is targeted (usually 45° relative to the thin film stack's surface normal as measured inside a polarization beam splitter), this constrains the refractive index of the cube's substrate material to match a value depending on the refractive indices of the materials used in the thin film stack. For example, if the thin-film stack is formed by alternating two materials of refractive indices $n_1$ and $n_2$, the glass substrate of the PBS should preferentially have a refractive index $n_G$ that verifies $n_G^2 = 2n_1^2 n_2^2 / (n_1^2 + n_2^2)$. Another method, referred to as the plate polarizer, does not require the angle of incidence to be exactly at the Brewster angle inside the thin film stack, relaxing design constraints. It relies on the dependence of the spectral width of the high-reflectivity wavelength range of a quarter wavelength stack (its stopband) on the strength of the reflection coefficients at the interfaces between thin films. When the wavelength of the light is within, but close to the edge, of the high-reflectivity range for one polarization, it can already be in the high transmission range for the other polarization, resulting in the required polarization selection. As a drawback, such configurations relying more on thin film interference effects can be more narrowband, unless they are optimized for supporting wider wavelength ranges, in which case the selectivity between the two polarizations (extinction) might suffer. Polarizers based on dielectric thin film stacks preserve the light in the blocked polarization in a usable beam since it is reflected into another predetermined direction (reflected polarization) than the light of the transmitted polarization. Thin film stacks can be fabricated by sequential dielectric coatings and may also be referred to as thin-film coatings.

The three types of polarization selective elements described above fall in the general category of surface treatments at the interface of or between dielectric materials.

Polarization selective elements can also be implemented in a PIC in the form of polarization selective couplers that either couple the light into the PIC and to further optical devices on the PIC, such as a waveguide, a modulator, a multiplexer etc., or that discard or reflect the light back according to its polarization. These polarization selective couplers can thus fulfill the dual role of a coupling element and an on-chip polarization filter. Similarly, polarization selective couplers can emit light from the PIC in a single polarization.

A single polarization grating coupler consisting of an arrangement of grates is such a coupling device that allows coupling of light on and off the PIC for a single polarization, typically but not always the polarization with the E-field oriented along the main axis of the grates. Such a grating coupler allows coupling light from a waveguide to a beam emitted from the surface of the PIC, or to capture a beam incident onto the surface of the PIC and couple it to a waveguide. While many of the figures show configurations with single polarization grating couplers, these are just one example of surface emitting polarization selective PIC coupler. Thus, these figures are also meant to represent the more general configurations comprising a generic, polarization selective, surface emitting/receiving coupler (simply referred to as surface emitting coupler for compactness in the following).

Another example of polarization selective coupler is a waveguide edge-coupler that allows to couple light to and from the edge of the PIC, combined with an on-chip element that lets one polarization pass and reflects, couples out or otherwise discards the other polarization. This polarization filter can for example be implemented in the form of a corrugated waveguide. Since integrated waveguides can be made highly birefringent (i.e., to have different effective indices for the two polarizations), for example by choosing a non-square, rectangular cross-section, such a corrugation can be made to have very different properties depending on the polarization of the light, so that it only reflects or couples out one polarization, while letting the other one pass through. By adapting the periodicity of the grating or the cross-section of the waveguide, it is possible to choose which polarization is transmitted and which polarization is discarded. The polarization sensitivity can also be implemented by other means, for example the waveguide corrugation can be replaced by a polarization selective reflector taking the form of a thin-film coating deposited on the edge of the PIC on top of the edge coupler interface. Such thin film coating is also part of the PIC.

For compactness of notations, the combination of an edge coupler or other coupler with insufficient polarization sensitivity with an on-chip polarization selective element is also referred to as a polarization selective coupler in the following, even if other optical elements are interposed between the two, since the required optical functionality is still achieved. A coupler or a combination of a coupler with another on-chip device such that there are substantial polarization dependent insertion losses is further referred to as a polarization selective coupler. Moreover, from the perspective of polarization management, a coupler followed by a PIC subsystem whose intended functionality is only obtained for one polarization, further referred to as a polarization selective subsystem, poses the same challenges as a polarization selective coupler, as the intended functionality is not obtained for the other polarization. Similarly, when the direction in which the light travels is inverted, light emitted from the polarization selective subsystem via the PIC coupler only has one polarization. Thus, for compactness of notations, a coupler followed/preceded by a polarization selective subsystem is also referred to as a polarization selective coupler even if the coupler is not polarization selective by itself. The terms PIC subsystem and photonic sub-circuit are used interchangeably herein.

More than 3 dB additional losses for one of the two polarizations already very significantly impacts the performance of a link with non-polarization-maintaining fiber if the two polarizations are not treated separately, so that this is already considered a polarization selective coupler from the perspective of polarization management. Some applications even require polarization dependent losses that are no more than 1 or 2 dB. More than 10 dB additional loss for one of the two polarizations would already allow for substantial optical isolation if used in an optical isolator, so that it is already considered a polarization selective coupler from the perspective of optical isolation. For some applications, additional loss as low as 5 dB might be acceptable.

One optical isolator implementation consists in a Faraday rotator (e.g., made from a garnet material to which a permanent magnetic field is being applied either as a consequence of the garnet's magnetization or from an additional magnet) placed in between two polarization selective elements. A Faraday rotator rotates the polarization of transmitted light in a non-reciprocal way, i.e., while the polarization of the light is rotated in one direction when it passes through the material in one direction, it is rotated in the same direction (same chirality) when it passes through the material in the other direction, instead of being rotated back. The working principle of the isolator is then as follows:

In the passing direction, the first polarizer transmits light with a predefined polarization. The Faraday rotator is then designed in a way that it rotates the polarization by 45° in one direction (rotation angles without a pre-sign might generally refer to either direction of rotation). The second polarizer is aligned accordingly so as to let the light pass through.

Light that is coming from the other direction instead is blocked by the isolator. Either, it does not match the passing polarization of the second polarizer and is directly blocked by the same. Instead, if matched to the second polarizer, it is rotated by the Faraday rotator by another 45°. Due to the non-reciprocal nature of the Faraday rotator, this ends up being the blocked polarization for the first polarizer, so that light is now too being filtered out.

While this baseline configuration only lets light pass through in the passing direction for one polarization, a number of configurations also exist that allow both polarizations to pass through in the forward (passing) direction. This will for example be achieved in the following (preferred embodiment C) by implementing the first polarizer by a polarization selective reflector and further processing both polarization dependent beam paths, effectively creating two such isolators in one glass-molded optical interposer structure combined with polarization selective couplers on the PIC, each handling one of the two polarizations.

Optical isolation is usually used at the output of a laser to avoid unstable operation due to light being reflected back into the laser cavity under ill-controlled conditions. The isolator can be placed immediately after the laser, or in some cases at some distance after the laser but still inside the transmitter subsystem, for example at the output of a PIC to which the laser is coupled in through another (input-)port. This can be acceptable as the sensitivity of lasers to back-reflections grows with the distance to the source of back-reflections, so that back-reflections occurring downstream in the optical link (for example at the receiver or at interposed devices such as optical switches or add-drop multiplexers) are much more critical.

In some cases, one of the two polarization selective elements is not required as a separate device if sufficient polarization sensitivity is already featured by another device. For example, a laser, by design of its cavity or of its gain medium, can have a sufficiently high rejection for the second polarization. In that case, the laser is considered to also be a polarization selective element of the isolator.

SUMMARY OF THE INVENTION

The invention described here enables single mode coupling with advanced functionalities such as polarization management and/or optical isolation with low-cost micro-optics. These micro-optics can be fabricated by glass molding and implemented as a precision glass molded interposer. In particular, molding in parallel of multiple piece parts by molding of a preform in the shape of a glass wafer, as well as wafer-scale surface treatment (e.g. thin-film coating, metal deposition or micro-patterning) and wafer-scale assembly of the micro-optics enable reduced cost manufacturing.

The invention comprises an optical assembly in which a (typically single-mode) device on a PIC, such as a single mode waveguide or a single mode laser, is coupled to a (typically single-mode) second optical element, such as a glass fiber or a laser, by means of a glass interposer. The glass interposer comprises at least one lens (typically two lenses) that allows matching a beam profile between the PIC and the second optical element (or vice versa, if the direction of propagation is inverted). The PIC comprises at least one polarization selective coupler and the glass interposer comprises at least one polarization selective reflector or polarization selective filter. In some embodiments, a Faraday rotator is also interposed in the beam path and may be attached to the glass interposer or to the PIC. Together, these elements enable not only low loss optical coupling, but also polarization management and/or optical isolation. Since the PIC and the second optical element can be in close proximity of lenses located on the optical interposer, free beam paths may be primarily within the interposer, facilitating assembly as previously explained. Since the PIC and/or the second optical element can be attached to mechanical contact facets/attachment interfaces of the glass interposer, angles in which beams are emitted from or received by the PIC or second optical element can be very well controlled.

The invention also comprises a method for the fabrication of the glass interposer based on high-precision glass-molding technology, including fabrication, surface treatment and preassembly of building blocks at the wafer-scale. Interposer geometries and assembly processes are optimized to minimize sensitivity against manufacturing tolerances, in particular the exact distance between the top and bottom molds with which building blocks are formed. A large number of functionalities and different interposers can be obtained with a single, or a small number of building block types.

Since polarization selective surface treatments applied to the glass interposer typically work for a restricted range of k-vectors (angles of incidence as determined after Fourier decomposition), it is advantageous for the beam to be collimated or near-collimated (reduced diffraction angle as compared to the emitted or received beams from PIC and second optical element), which is why it is advantageous for the glass interposer to comprise at least two lenses with the polarization selective surface treatment interposed in between from the perspective of the beam path. Possible polarization selective surface treatments comprise metal gratings, dielectric gratings or thin-film coatings as described above. In the following, description of beams as being collimated may also mean near collimated, in the sense of having a substantially narrower k-vector distribution than the beams emitted/received from the PIC and the second optical element. Substantially collimated may refer to the angle of diffraction of the beam to be below half of that of the beams emitted/received from/by the PIC and second optical element. It may also refer to the full width at half maximum (FWHM) of its k-vector distribution to be below half of that of the beams emitted/received from/by the PIC and second optical element.

BRIEF DESCRIPTION OF THE DRAWINGS

FIG. 1 (*b*) depicts an optical subassembly attached to a printed circuit board according to aspects of the disclosure.

FIG. 3 (*b*) depicts two polarizations from a second optical element to two different couplers on a photonic integrated circuit according to aspects of the disclosure.

FIG. 3 (*c*) depicts a glass interposer placed on the side of a photonic integrated circuit according to aspects of the disclosure.

FIG. 4 (*b*) depicts an optical isolator and an edge emitting coupler according to aspects of the disclosure.

DETAILED DESCRIPTION OF THE INVENTION (APPARATUS)

The invention comprises a micro-optical component that can be made from molded glass, interchangeably referred to as glass interposer or optical interposer [300], that has at least one polarization selective reflector or polarization selective filter [310] implemented with treatment of an internal or external surface, and a photonic integrated circuit (PIC) [100] that comprises at least one polarization selective coupler [110]. The glass interposer enables coupling of light between the polarization selective coupler on the PIC to or from a second optical element [200].

Figure 1A:
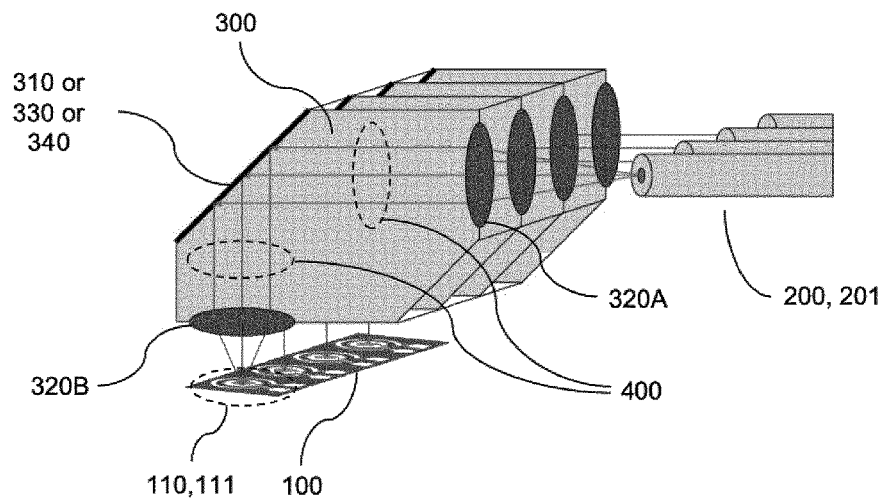
FIG. 1 (*a*) depicts a second optical element according to aspects of the disclosure.
Figure 1B:
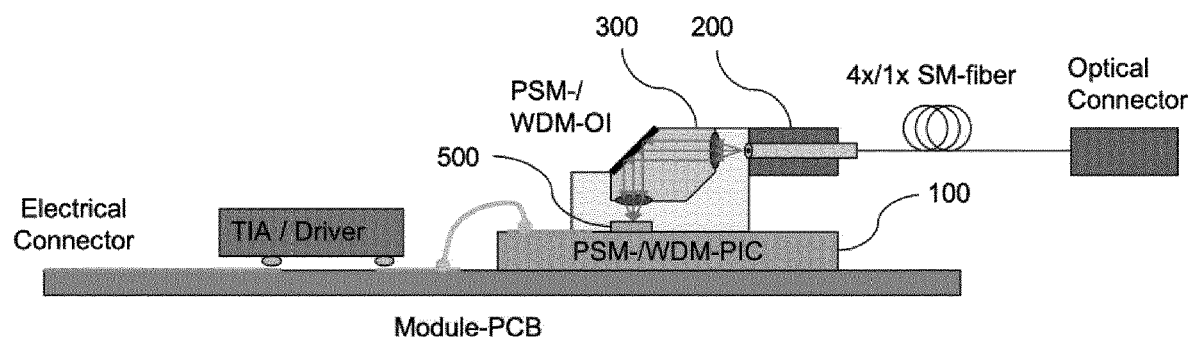

FIG. 1(*a*) shows an embodiment in which the second optical element [200] is embodied by a glass fiber [201] and the polarization selective coupler [110] by a single polarization, single mode VCSEL [111]. A VCSEL is considered a polarization selective coupler if it emits a single polarization and rejects reflections in the other polarization by means of its cavity and gain medium design. More conventionally, polarization selective couplers in the following will also be devices coupling light to or from a waveguide [120] of the PIC [100], that may be a single mode waveguide, in a manner that is polarization selective. Such polarization selective couplers are for example single polarization grating couplers [112] or edge couplers [113], that can be implemented in combination with an additional polarization selective element [130] such as a waveguide corrugation [131] or a thin-film coating [132] applied to the PIC. The glass interposer [300] comprises two lenses [320A] and [320B] as well as a polarization selective reflector [310]. Together, the PIC, glass interposer and the fibers form an optical subassembly, that is further attached to a printed circuit board comprising further components (FIG. 1(*b*)) such as electronics, for example a transimpedance amplifier (TIA) or a modulator or laser driver, and an edge connector, such as a Quad Small Form Factor (QSFP) connector. The fibers can be attached to a standard fiber connector, such as a multi-fiber MPO connector. In the figure, PCB stands for printed circuit board, PSM for parallel single mode, WDM for wavelength division multiplexing, OI for optical interposer, SM for single mode. In other embodiments of the invention, the interposer may also comprise a simple reflector [330] or a wavelength selective reflector [340] instead of or in addition to the polarization selective reflector [310].

Figure 2:
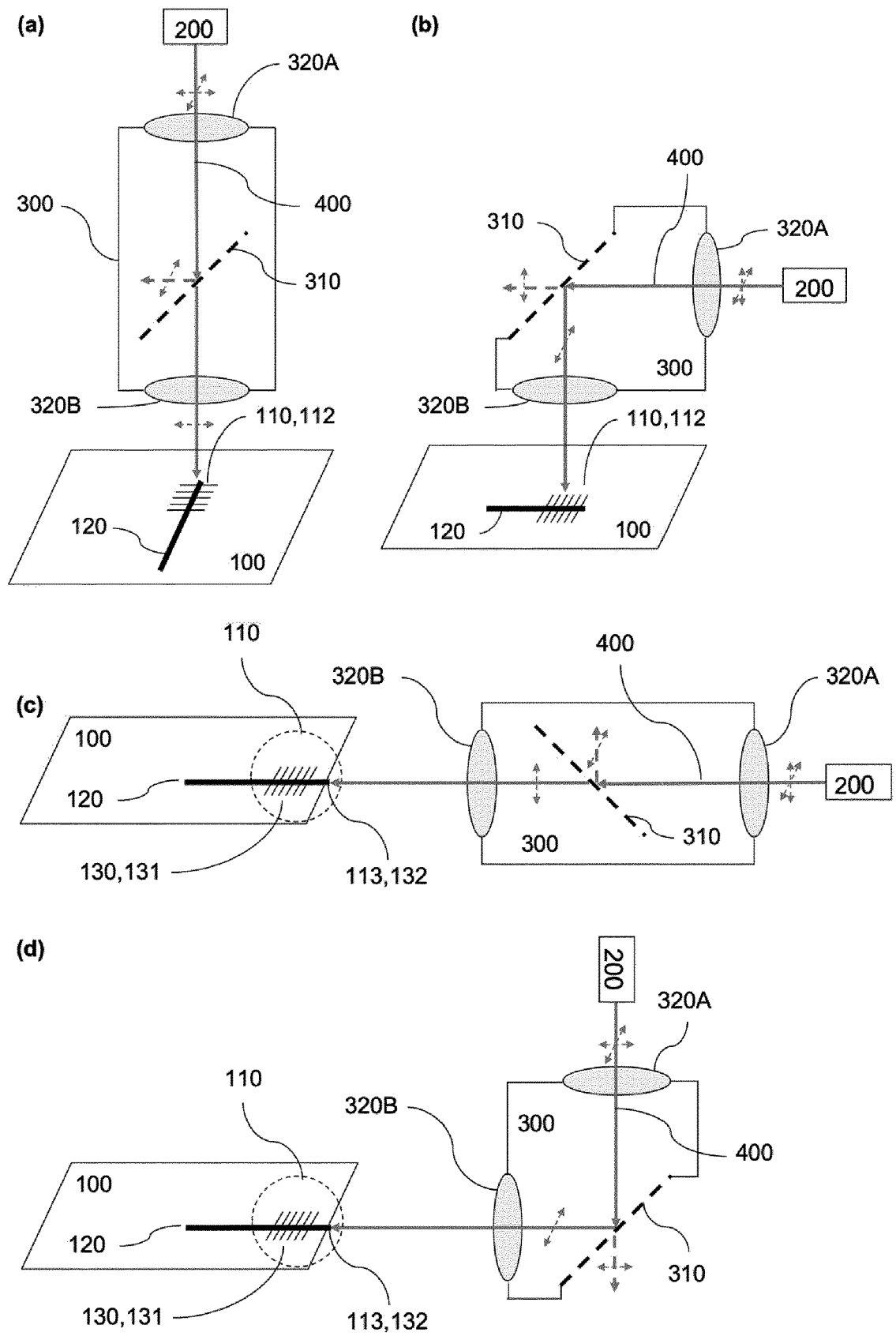
FIG. 2 depicts different configurations for a beam path between a polarization selective coupler and a second optical element according to aspects of the disclosure.

FIG. 2 shows different configurations for the beam path between the polarization selective coupler [110] and the $2^{nd}$ optical element [200]. Light coming from the second optical element is collimated using a first lens [320A] and directed to the polarization selective reflector or filter [310] of the glass interposer [300]. This element separates the beam according to its polarization into one of two beams and directs at least one beam, with a single polarization, to a second focusing lens [320B] that focuses the light onto the polarization selective coupler [110] on the PIC. The device may also be operated with the beam path being reversed, i.e., light emitted from the polarization selective coupler [110] of the PIC is coupled to the $2^{nd}$ optical element [200] using the glass interposer [300]. Exemplary polarizations of beams [400] are indicated in FIGS. 2 to 6 by dashed double sided arrows superimposed on the beam paths. These are exemplary only—what matters in general is that they are orthogonal to each other when several beams are present and that they correspond to the transmitted or filtered/reflected polarizations of the polarization selective filters or reflectors [310]. To exemplify possible implementations, they are generally shown as the polarizations that would be needed if polarization selective elements on the optical interposer were to be implemented as polarization selective filters or reflectors using thin-film coatings in the MacNeille configuration. Arrows also indicate the path along which light propagates.

The configurations shown in FIGS. 2(a)-2(d) are differentiated in that the optical beam is either received/emitted by/from the edge of the PIC or by/from the top surface of the PIC. These two configurations are of practical relevance, as they correspond to different types of PIC couplers that both have advantages and disadvantages. For example, grating couplers emit light from the top surface of the PIC in an angle that is typically within +/−30° from the normal to the surface and are a category of surface emitting couplers. They have the advantage to enable wafer-scale probing and sorting of PICS prior to singulation into dies, but also suffer from a restricted wavelength range of operation. Edge couplers, on the other hand, are broadband, but are more difficult to probe at the wafer level. They can also result in more complex assembly, as the edge of the die offers a smaller attachment surface and emitted/received beams typically have smaller lateral dimensions than for grating couplers, resulting in more stringent alignment tolerances.

The configurations are also differentiated from each other in that the beam is either emitted/received from the $2^{nd}$ optical element [200] in an angle that is either substantially perpendicular to the surface of the PIC (for example in an angle within +/−30° from the surface normal) or in a direction that is substantially parallel to the surface of the PIC (for example in an angle within +/−30° from a direction parallel to the surface). This is of high practical relevance, as current form factors for electro-optic transceivers typically specify fibers to terminate at connectors at the edge of the module. In this case, it is advantageous to route out the light as shown in configurations (b) and (c). On the other hand, an emerging trend for optical communications in datacenters consists in the co-packaging of electronic switch fabrics with electro-optic transceivers. This removes interposed printed circuit board signal traces and reduces electronic signal attenuation and distortion between the switch chip and the electro-optic module. Consequently, the power consumption associated to electrical data transport between electro-optic transceivers and the switch fabric can be reduced. However, this requires dense packing of fibers accessing such co-packaged optics. A 12.8 Tb/s switch chip requires for example 32 modules each transmitting and receiving 400 Gb/s, corresponding to a total of 256 fibers if each transports 100 Gb/s in one direction. Such large number of fibers could be fit in a 2-dimensional array of 16 by 16 fibers closely packed into 4 by 4 mm with a 250 µm pitch. This requires however the fibers to exit from the top of the package. In such a case, configurations as shown in (a) and (d) are advantageous.

In configurations (a) and (b), the polarization selective PIC coupler [110] is emitting/receiving beams from/to the top surface of the PIC, i.e., it is a surface emitting coupler, and may be a single polarization grating coupler [112]. In configurations (c) and (d), the polarization selective PIC coupler is emitting/receiving beams from/to the edge of the PIC and may be an edge coupler [113] combined with a polarization selective element [130] such as a corrugated waveguide [131] inside the PIC or a surface treatment in the form of e.g. a thin-film coating [132] applied to the edge of the PIC. In all four configurations, a pair of lenses [320A], [320B] images the beam from/to the PIC [100] to/from the $2^{nd}$ optical element [200]. A polarization selective reflector or filter [310] is applied to an outer or an inner surface of the glass interposer and lets one polarization propagate to/from the $2^{nd}$ optical element from/to the polarization selective coupler on the PIC. The other polarization is routed away or absorbed, and either discarded or routed elsewhere, for example to another coupler on the PIC. A polarization selective reflector [310] can also be used to combine two beams with different (orthogonal) polarizations, for example as emitted by two polarization selective couplers of the PIC or by a second and a third optical element, into a single beam.

Configurations (a) and (c) are characterized in that the selected polarization is transmitted through the polarization selective reflector or filter [310], while configurations (b) and (d) are characterized in that the selected polarization is reflected by the polarization selective reflector [310].

In the following, four preferred embodiments of the invention, corresponding to FIGS. 3 to 6, are described. This is followed by a description of a method to manufacture and assemble the optical glass interposer [300].

A: In a first preferred embodiment depicted in FIG. 3(a), the apparatus couples the two polarizations from the $2^{nd}$ optical element [200] to two different couplers [110A], [110B] on the PIC [100]. Such functionality is for example advantageous in a receiver receiving light from a standard single mode fiber [201] in which the polarization of the light has been scrambled or In which data is encoded in both polarizations. Alternatively to the apparatus described here, one could use dual-polarization couplers on the PIC. Such couplers tend however to have higher insertion losses, to suffer from higher polarization dependent loss (PDL), and to impose more constraints on the fabrication technology. Alternatively, the apparatus described here can be used to launch light from the PIC [100] into a fiber [201]. In such a case, light will have a polarization in the fiber that depends from which PIC coupler it has been emitted from. Such functionality is for example advantageous in dual-polarization transmitters that use the two polarizations as independent communication channels (for example using dual-polarization quadrature phase shift keying, or DPQPSK), in each of which data is being encoded.

The preferred embodiment comprises a micro-optical element made from glass, i.e., the glass interposer [300] and a PIC [100]. The glass interposer comprises a first lens

[320A], a second lens [320B], a third lens [320C], a first polarization selective reflector [310], and a second reflector [330] that can be polarization selective or not. While a polarization insensitive reflector would satisfy the required functionality for element [330], only one polarization passes there, so that a polarization selective reflector reflecting said polarization can also be used. This may be advantageous in some manufacturing flows to reduce the number of different surface treatments that have to be applied. For example, in the variant shown in FIG. 3(b), elements [310] and [330] need to reflect the same polarization, so that they could in principle be obtained by the same surface treatment.

Figure 3A:
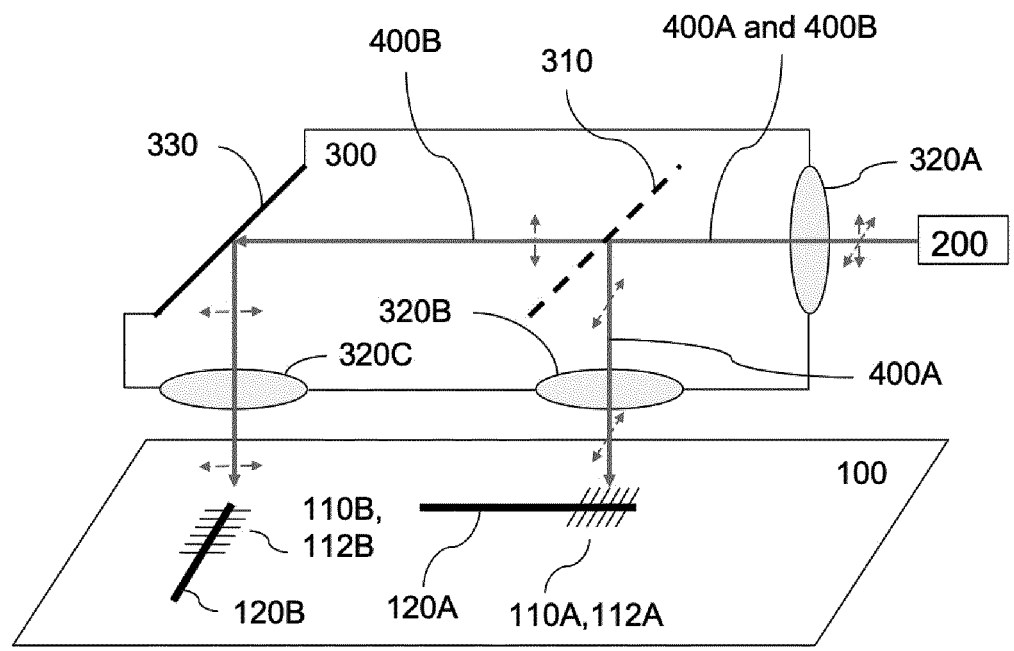
FIG. 3 (*a*) depicts two polarizations from a second optical element to two different couplers on a photonic integrated circuit according to aspects of the disclosure.
Figure 3B:
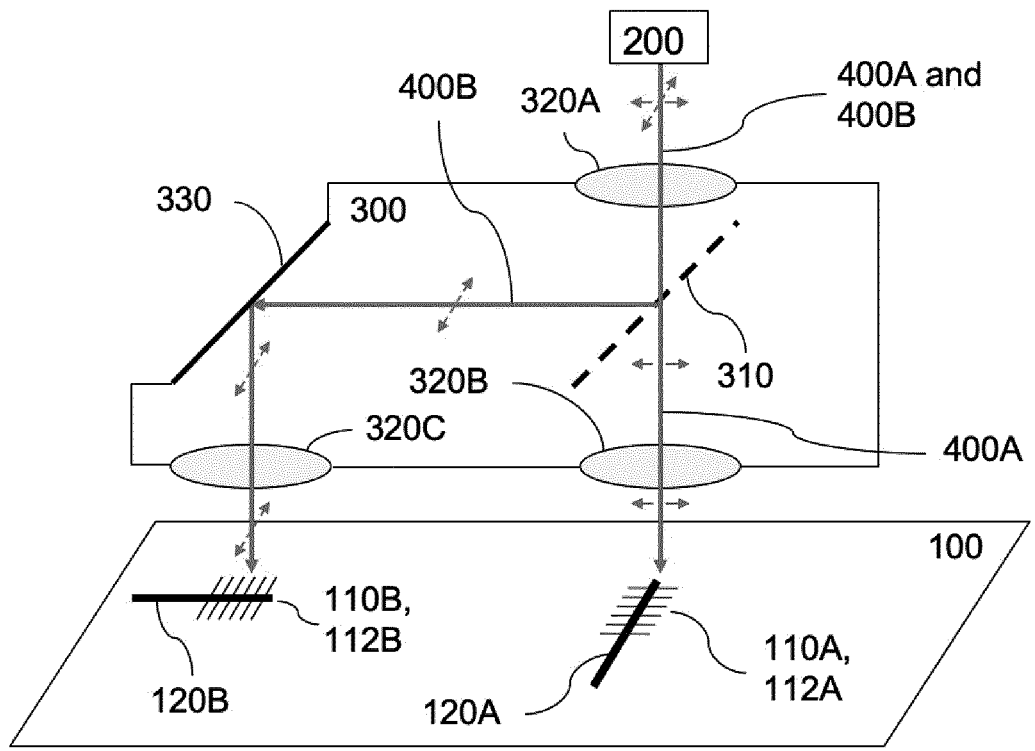

The PIC [100] comprises a first polarization selective coupler [110A] and a second polarization selective coupler [110B] that each couple light between an on-chip waveguide [120A], [120B] and a free-space beam [400A], [400B], wherein the polarization of the two free-space beams coupled to by the two polarization selective couplers have substantially orthogonal (opposite) polarizations relative to each other. This can be achieved for example by orienting the polarization selective couplers [110A], [110B] orthogonally to each other on the surface of the PIC, as shown in FIGS. 3(a) and 3(b) for the case of surface emitters/receivers. Typically, the angle of the out-of-plane beam may be perpendicular to the surface of the PIC (i.e., be along the surface normal) or may deviate by at most 30° from that axis.

Even if the light exits or enters surface emitting PIC couplers with an angle relative to the surface-normal of the PIC, collimated beams generated by lenses [320B] and [320C] inside the optical interposer [300] end up propagating along the direction of said surface-normal if the optical axes of the lenses are along said surface-normal and if the surface emitting couplers are centered relative to the lenses (i.e., are on their optical axes). Embodiments A-D may be implemented this way. Similar considerations apply to the second optical element [200] if it emits or receives light at a small angle relative to a direction parallel to the PIC surface/relative to the direction of the optical axis of lens [320A], as depicted in FIG. 3(a). This would for example be the case if the second optical element [200] is a glass fiber [201] with an end-facet polished with an angle. If the core of the fiber at the end facet is centered relative to the lens [320A] (i.e., is on the optical axis of the lens) and the optical axis of the lens [320A] is parallel to the surface of the PIC, the collimated beams [400A], [400B] generated by the lens [320A] inside the optical interposer [300] will be parallel to the PIC surface. Directions of beams as shown in FIGS. 2 to 6 may also deviate from the depicted directions inside the interposer, for example by a maximum of 20°.

The polarization selective reflector [310] combines the two beams [400A], [400B] before routing them to the second optical element [200] (when coupling light from the PIC to the second optical element), or splits the two beams [400A], [400B] so that they can be independently routed to the two polarization selective couplers [110A], [110B] (when coupling light from the second optical element to the PIC). Generally, all the coupling schemes described here can be operated in either direction.

Two coupling schemes are thus differentiated by the direction in which light travels: For the first coupling scheme, light coming from the second optical element [200] has 2 possible polarizations, i.e., the electric field may be oriented along a direction perpendicular to the plane of the interposer cross-section shown in FIG. 3(a) (further referred to as the s-polarized light) or it may be oriented parallel to this plane (further referred to as the p-polarized light). In FIG. 3(a), beam [400A] is exemplarily shown as being s-polarized and beam [400B] is exemplarily shown as being p-polarized. The light is collimated using the first lens [320A] and directed towards the first polarization selective reflector [310] of the glass interposer [300]. Here, light with one polarization, e.g., the s-polarized light, is reflected towards the second lens [320B] and focused on the polarization selective coupler [110A] on the PIC and thereby coupled to a waveguide [120A] on the PIC. Light with the other polarization, e.g., the p-polarized light, is transmitted through the polarization selective reflector [310], directed to the second reflector [330] where the light is reflected towards the third lens [320C] and focused on the second polarization selective coupler [110B] on the PIC and coupled into another waveguide [120B] of the PIC. This coupling scheme may be used for example to couple both polarizations propagating in a single mode optical fiber [201] to a PIC [100], where the polarization is not controlled inside the fiber or is used to independently encode data on two communication channels.

For the second coupling scheme, the propagation direction of the light is reversed. Light from both PIC couplers [110A], [110B] is thus coupled into the second optical element [200] such as a fiber [201] with a polarization that depends from which polarization selective coupler [110A], [110B] it was emitted from. This coupling scheme may be used for example at the output of a PIC to couple light from a transmitter circuit that implements polarization multiplexing (encoding of data onto both polarizations) into a single mode optical fiber.

As an advantage of the configuration shown in FIG. 3(a), that relies on orthogonally oriented surface emitting/receiving couplers [110A], [110B] on the PIC, light coupled into waveguides [120A], [120B] of the PIC ends up with the same polarization inside PIC [100], even though it has orthogonal polarizations in the free space beams between PIC and second optical element [200]. This facilitates PIC design as components inside the PIC can all be designed for the same polarization. Preferred embodiments A-D can all be configured this way when using surface emitting couplers. When using edge couplers, it may be necessary to implement a (typically reciprocal) polarization rotator inside the PIC in order to obtain the same polarization thereafter inside the PIC.

Figure 3C:
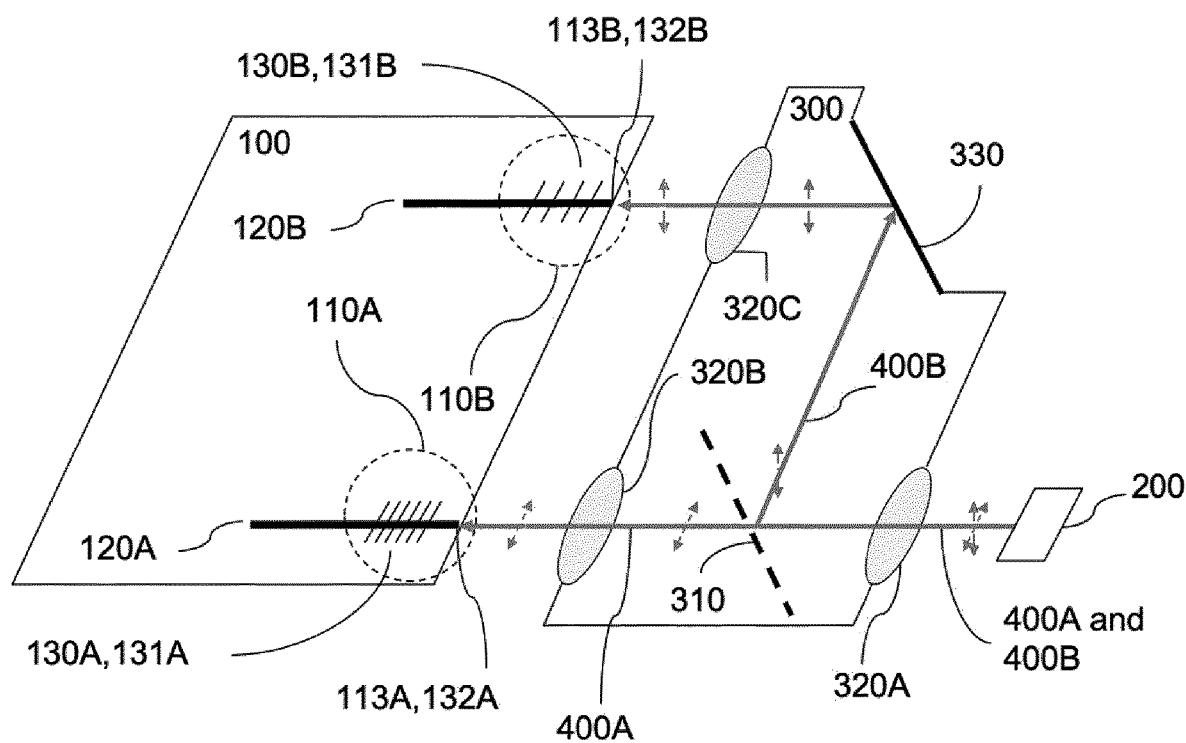

The configuration shown in FIG. 3(a) can be generalized based on the different configurations shown in FIG. 2. For example, the polarization selective couplers [110A] and [110B] may be edge couplers, in which case the glass interposer [300] may be placed on the side of the PIC as shown in FIG. 3(c). Light might also be coupled to and from a $2^{nd}$ optical element [200] in a direction substantially perpendicular to the surface of the PIC as shown in FIG. 3(b), wherein this is simply achieved by moving the position of the lens [320A] and reorienting the orientations of the grating couplers (surface emitting couplers) [112A], [112B], showing that surface coupler orientation in particular (and PICS in general) have to be co-designed with the optical interposer to match each other's requirements.

When used in edge-coupling configuration, the preferred polarization of the polarization selective couplers can for example be determined by changing the waveguide cross-section or grating periodicity in a corrugated waveguide [131], so that the Bragg condition is verified for the rejected polarization. This is exemplarily shown in FIG. 3(c) in which the periodicity of the corrugations [131A] and [131B] are shown to be different.

In this preferred embodiment, polarization management is achieved by utilizing a polarization selective reflector [310] on the glass interposer and by orienting or adapting polarization selective couplers [110A], [110B] on the PIC according to the received or emitted polarizations. This way, the polarization management is distributed over the PIC and the glass interposer. Here, polarization management refers to polarization multiplexing and/or demultiplexing.

B: In a second preferred embodiment depicted in FIG. 4, the apparatus implements an optical isolator. Optical isolators are non-reciprocal optical devices that transmit light in one direction (passing direction) and block light in the reverse direction (blocking direction). Here, the optical isolator consists of a Faraday rotator [500] embedded between 2 polarization selective elements [110], [310] that transmit light of one polarization and block or reroute light of the other polarization. By adding a Faraday rotator in the beam-path between a polarization selective reflector or filter [310] of the optical interposer [300] and a polarization selective coupler [110] of the PIC [100], the single mode coupling apparatus is enhanced with optical isolation functionality. This apparatus may be utilized at the output of a transmitter PIC to protect an upstream laser from back-reflections occurring downstream of the transmitter, for example in the fiber or in the receiver. By integrating the optical isolator into the fiber coupler, the assembly cost of the laser-subassembly and thereby the assembly cost of the whole transceiver system can be substantially reduced. In particular, this enables flip-chip or heterogeneous laser integration without sacrificing isolation functionality. Since the optical path length between the laser and the fiber coupler is typically relatively short, on the order of a few mm or cm, this can be acceptable in terms of maintaining stable low noise laser operation. The apparatus can also be used at the input of a transmitter PIC to couple a laser into the PIC, again isolating the laser from back-reflections. In this case, the direction of the light is inverted relative to the one depicted in FIG. 4(a) (and the rotation direction of the Faraday rotator inverted or the orientation/configuration of the polarization selective coupler changed to interchange the passing and blocking directions of the isolator). As already mentioned, coupling schemes described here can be used in either direction, wherein in the case of optical isolation a small adaptation as described above has to be made due to the non-reciprocal nature of the beam path.

Figure 4A:
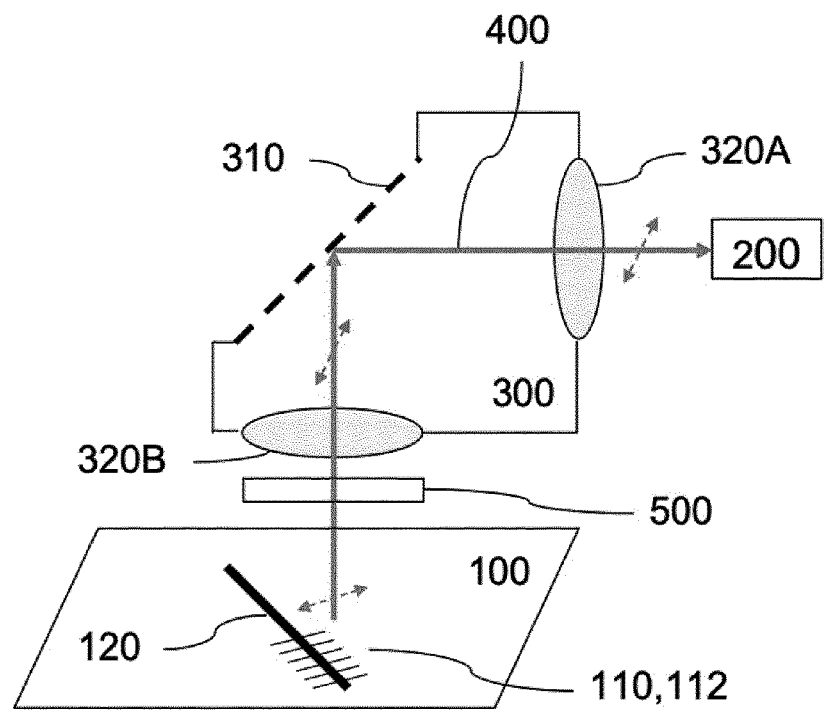
FIG. 4 (*a*) depicts an optical isolator according to aspects of the disclosure.
Figure 4B:
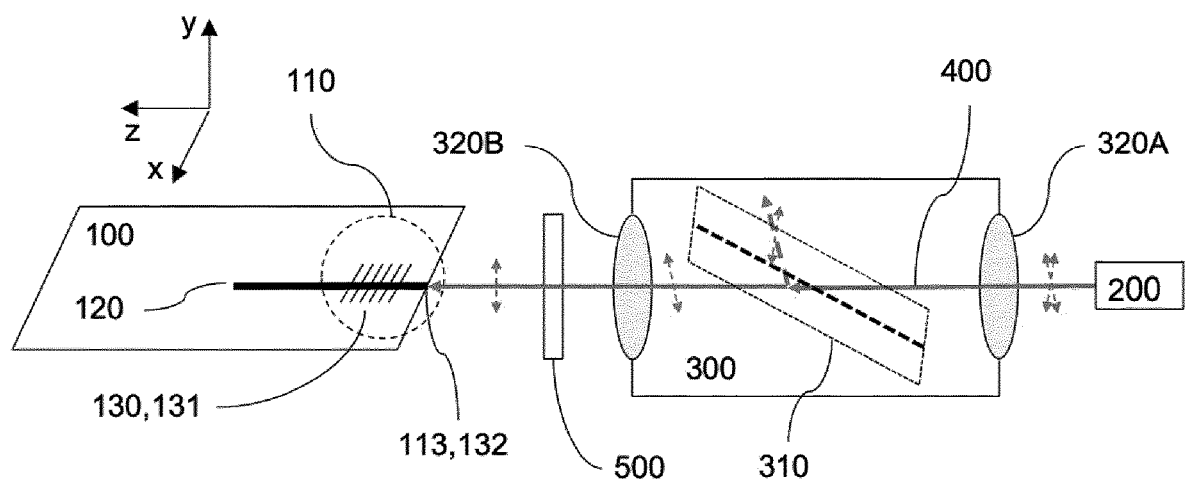

The preferred embodiment comprises a micro-optical element made from glass, i.e., the glass interposer [300], a PIC [100], a second optical element [200], and a Faraday rotator [500]. The glass interposer comprises a first lens [320A], a polarization selective reflector or filter [310], and a second lens [320B]. The PIC comprises a polarization selective coupler [110], that couples light from a preferred polarization to a waveguide [120] on the PIC. When light is coupled to/from the PIC via the surface of the PIC, as shown in FIG. 4(a), the orientation of the polarization selective coupler [110] has to be chosen according to the direction in which the isolator is to be operated, as described in the following. In the case of an edge emitting coupler, as shown in FIG. 4(b), the coupler has to be adapted to be selective to the targeted polarization. The Faraday rotator element [500] may be integrated/attached in/to the interposer [300], or may be integrated/attached in/to the PIC [100]. It may also be a separate element that is placed anywhere in the beam path between the polarization selective reflector or filter [310] of the interposer [300] and the polarization selective coupler [110] of the PIC [100].

Two coupling schemes are described, differentiated by the direction in which light travels: For the first coupling scheme, light coming from the second optical element [200] is (i) first collimated using a first lens [320A] and directed towards the polarization selective reflector or filter [310]. (ii) The polarization selective reflector or filter now either reflects (FIG. 4(a))/transmits (FIG. 4(b)) or discards the beam depending on its polarization. In the case that the second optical element [200] only supports a single polarization, as is the case for example for certain semiconductor lasers, the polarization selective reflector [310] may be replaced by a polarization insensitive reflector [330] in the case of a coupling scheme in which the beam is reflected as depicted in FIG. 4(a). The polarization selective filter [310] may also simply be omitted in case of a straight coupling scheme as depicted in FIG. 4(b). In this case, the first polarization selective element is effectively moved to the second optical element [200]. (iii) The light is then focused by a second lens [320B] of the optical interposer [300] onto the polarization selective coupler [110] of the PIC [100], so that it couples all or a fraction of the light into the PIC waveguide [120]. The Faraday rotator [500] is designed in a way that it rotates the polarization of the beam by 45° in a non-reciprocal manner.

Light directly reflected from the coupling interface of the PIC maintains its polarization. Light coupled into the PIC and reflected back, from a device inside the PIC or after the PIC, also maintains its initial polarization, as the polarization selective coupler [110] only generates beams with a fixed polarization coinciding with the targeted polarization of the incoming beam. The polarization of the light that is coming back from the PIC, propagating in the reverse direction, is again rotated by 45° in a non-reciprocal manner by the Faraday rotator [500]. In case a polarization selective reflector or filter [310] has been implemented, its behavior is now switched: If in (ii) it reflected (FIG. 4(a))/transmitted (FIG. 4(b)) the beam, it is now discarding it due to the switched polarization. In other words, if element [310] is a polarization selective reflector, transmitting and reflecting behavior are swapped for the reflected, returning beam. Thus, the reverse optical path takes a different route than the forward one and the beam is not coupled back to the second optical element [200]. If the second optical element [200] only accepts a single polarization and the polarization selective reflector or filter [310] was not implemented, the reflected light is routed back to the second optical element [200]. However, since the second optical element [200] only supports a single polarization, the light is now being rejected by it, so that the optical isolation functionality is still fulfilled. Thus, in all cases, the second optical element [200] is effectively isolated from reflections occurring at or after the PIC [100]. This coupling scheme may be used for example to couple a laser to a PIC either directly or using a fiber between the laser and the coupling device (an extension of the apparatus described as preferred embodiment C also supports a laser connected by a non-polarization maintaining fiber).

For the second coupling scheme corresponding to the passing direction being from the PIC [100] to the second optical element [200], light coming from the PIC is coupled out of the PIC by the polarization selective coupler [110] with a single polarization. This polarization is rotated 45° by the Faraday rotator [500], collimated by the second lens [320B] and directed towards the polarization selective reflector or filter [310] of the interposer [300]. The light is then focused by the first lens [320A] of the interposer [300] on the coupling interface of the second optical element [200] and coupled to the latter.

Light that is reflected from the second optical element [200] can have either of the two polarizations, for example if the second optical element comprises a fiber in which the polarization is scrambled. However, in both cases it is prevented from being coupled back into the PIC: Either light has the right polarization to be routed back by the polarization selective reflector or filter [310] and the two lenses [320A] and [320B] onto the polarization selective coupler [110]. The rotation of the Faraday element is chosen in such a way that light then has the orthogonal polarization from the one coupled by the polarization selective coupler [110], so that it is then prevented from being coupled back into the PIC. Or light has the other polarization, so that the polarization selective reflector [310] does not couple it back to the polarization selective coupler [110] and light is again prevented from coupling back into the PIC. Thus, here too isolation functionality is obtained in that light reflected back from the second optical element [200] does not couple back into the PIC [100], irrespectively of its polarization. This coupling scheme may be used for example to couple a PIC to a fiber at the output of a transmitter circuit to effectively isolate the transmitter and its light source from back-reflections occurring in the fiber and/or other optical circuitry implemented further downstream of the transmitter.

As for embodiment A, here too the configuration shown in FIG. 4(a) representing coupling to and from the PIC via the top surface of the PIC, can be generalized to a configuration in which light is coupled to and from the PIC via an edge of the PIC (FIG. 4(b)). In such a configuration, the polarization sensitivity of the edge coupler [113] can for example be obtained with a waveguide corrugation [131] whose periodicity is adjusted depending on which polarization is to be transmitted or reflected, or by a thin-film coating [132]. In FIG. 4(b), the polarization of the light at the interface to the edge coupler is preferentially along the x- or y-directions, as indicated in the figure, as these correspond to the polarizations that are typically conserved by the waveguide modes. This facilitates for example the design and fabrication of a corrugation [131]. As a consequence of the 45° rotation induced by the Faraday rotator [500], the surface normal of the polarization selective reflector or filter [310] is then preferentially along the [½, ½, −1/√2] or the [−½, ½, −1/√2] directions, in the coordinate system indicated in the figure. In other words, the optical interposer [300] has been rotated +/−45° with the z-axis as the rotation axis relative to the configuration shown in FIG. 2(c) in order to accommodate the Faraday rotator.

In this preferred embodiment, optical isolation is achieved by utilizing a polarization selective reflector or filter [310] on the glass interposer [300] and by orienting or adapting a polarization selective coupler [110] on the PIC [100] according to the received or emitted polarization. This way, the optical isolation is distributed over the PIC and the glass interposer.

Figure 5:
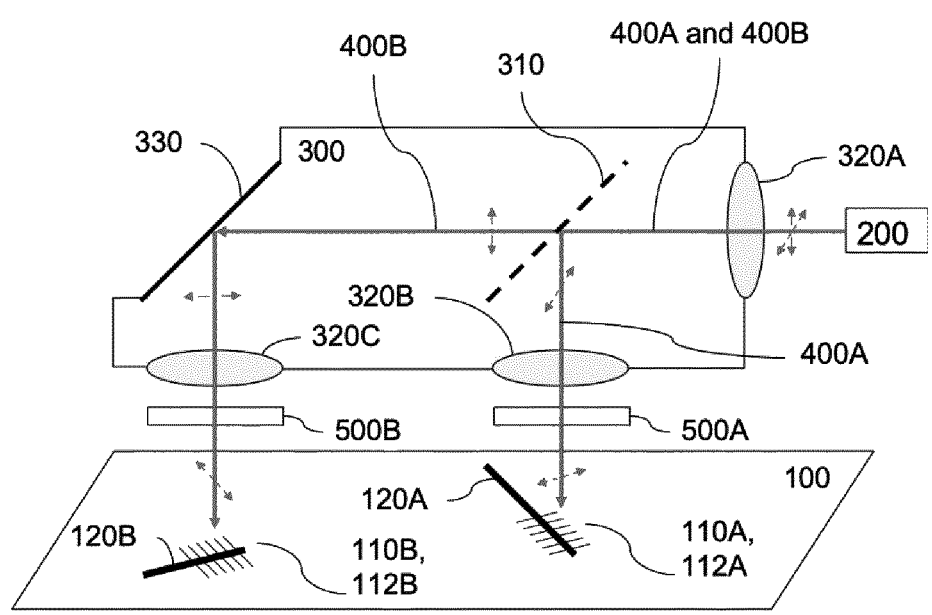
FIG. 5 depicts polarization dependent routing and optical isolation according to aspects of the disclosure.

C: In a third preferred embodiment, as depicted in FIG. 5, the apparatus combines the functionality of preferred embodiments A and B, enabling both polarization dependent routing and optical isolation. In order to achieve these functionalities, the embodiment comprises a glass interposer [300], a PIC [100], and a first and second Faraday rotator [500A] and [500B]. This embodiment may be used as a fiber coupler at the input of the PIC to connect it to a light source. It then allows coupling both polarizations arriving from the light source into the PIC, while protecting the light source from reflections from the PIC. Even if the light source is a laser emitting a single polarization, this polarization can be scrambled in a single mode fiber interposed between the laser and the PIC. While polarization maintaining (PM) fiber would prevent polarization scrambling, PM fiber is more expensive to manufacture and much more expensive to assemble, as it has to be carefully aligned for its slow and fast axes to be oriented parallel/perpendicular to the transported light polarizations. Alternatively, this embodiment may be used at the output of a PIC to couple it to a fiber. It then allows to couple light with either polarization into the fiber, as required for example in a transmitter using polarization multiplexing, i.e., encoding data on both polarizations. At the same time, it protects the PIC and light sources incorporated inside the PIC or implemented upstream of the PIC from reflections occurring after the output of the PIC. In this latter case, the forward direction of the isolators in inverted as compared to the former case. As in the preferred embodiment B, the direction of rotation of the Faraday rotators [500A], [500B], or the orientation/configuration of the polarization selective couplers [110A], [110B] and/or of the polarization selective reflector or filter [310] can be adjusted depending on the direction in which light is intended to travel. In FIG. 5, the orientations of the grating couplers [112A] and [112B] have for example been rotated by 45° relative to FIG. 3(a), to account for the fact that the polarization of the beams [400A] and [400B] is being rotated by an additional 45° by Faraday rotators [500A] and [500B]. Grating couplers [112A] and [112B] remain oriented orthogonally to each other. It would be also possible for one Faraday rotator to be configured to rotate an incoming beam by +45° and the other Faraday rotator to be configured to rotated an incoming beam by −45°, for example by flipping one Faraday rotator relative to the other. In that case, the two grating couplers [112A] and [112B] would have to be oriented parallel or antiparallel to each other.

In this preferred embodiment, optical isolation and polarization selective routing are jointly achieved by utilizing a polarization selective reflector or filter [310] on the glass interposer [300] and by orienting or adapting polarization selective couplers [110] on the PIC [100] according to the received or emitted polarization. This way, the optical isolation and the polarization selective routing functionalities are distributed over the PIC and the glass interposer.

D: In a fourth embodiment illustrated in FIG. 6, the apparatus implements single mode coupling from a second optical element [200A] to the PIC [100] and from the PIC [100] to a third optical element [200B] in such a way that light received by and re-emitted from the PIC [100] can have an arbitrary polarization. Moreover, light can be processed on the PIC by an on-chip photonic, electro-optic or optoelectronic device [150] irrespectively of said polarization. The photonic, electro-optic or optoelectronic device is a device that processes light with or without transduction to or from the electrical domain and can for example be an optical filter, wavelength division multiplexer, optical add-drop multiplexer, or an electro-optic modulator. It can also comprise a photodetector, for example in combination with a power monitor tap or an optical add-drop multiplexer. It can be reconfigurable according to an electrical control signal and can generate or transduce high-speed electrical signals. Irrespectively of whether it involves electrical signals or not, it will be referred to as photonic device in the following.

The apparatus comprises a molded glass interposer [300], a PIC [100] with two polarization selective couplers [110A], [110B] and a photonic sub-circuit [140] connecting these two elements, and 2 Faraday rotators [500A], [500B]. The photonic sub-circuit [140] is a subset of the optical circuitry on the PIC [100] and comprises one or several photonic devices [150].

The PIC connects the 2 polarization selective couplers [110A] and [110B] by a bi-directional photonic sub-circuit [140], so that at least part of the light that enters the PIC through the first polarization selective coupler [110A] exits the PIC through the second polarization selective coupler [110B] and at least part of the light that enters the PIC through the second polarization selective coupler [110B] exits the PIC through the first polarization selective coupler [110A]. The photonic sub-circuit [140] has at least two ports [141A] and [141B], one of which is connected to polarization selective coupler [110A] and the other of which is connected to polarization selective coupler [110B] by means of waveguides [120A] and [120B]. At least part of the light injected into the photonic sub-circuit [140] via one of these ports exits the photonic sub-circuit [140] via the other one of these ports.

The photonic sub-circuit [140] can further process the light, for example by modulating in amplitude and/or phase according to a data stream, by filtering it according to wavelength, by monitoring it with a tap and a photodetector, by dropping certain communication channels according to wavelength and subsequently photodetecting them, or by adding certain communication channels according to wavelength. In other words, some but not all of the light needs to be transmitted between the two ports [141A] and [141B] of the photonic sub-circuit [140]. Light may be transmitted between the two ports [141A] and [141B] for all wavelengths, or for only some wavelengths, for example if the optical circuit [140] comprises a wavelength selective photonic device [150].

The photonic device [150] may also be a device with at least two ports, such that one of its ports is directly or indirectly connected to port [141A] and the other one of its ports is directly or indirectly connected to port [141B]. Similarly, ports [141A] and [141B] may be directly connected to polarization selective couplers [110A] and [110B] with waveguides [120A] and [120B], or may be indirectly connected to polarization selective couplers [110A] and [110B], for example via an interposed device. Two components on the PIC are considered to be connected if at least some light propagates from one component to the other. A direct connection refers to a direct connection with a waveguide, while an indirect connection refers to a connection with one or several interposed devices. In the simplest case, the photonic sub-circuit [140] consists in such a 2-port photonic device [150], in a waveguide connecting the first polarization selective coupler [110A] to the first port of device [150], and in a waveguide connecting the second polarization selective coupler [110B] to the second port of device [150].

Photonic device [150] may be a bi-directional device that fulfills its functionality for both directions in which light can propagate through the device, either from the first to the second or from the second to the first of its ports. In a preferred embodiment, the 2-port photonic device [150] is an electro-optic modulator [151] that modulates light entering through either one of its optical ports and transmits the modulated light to the other one of its two optical ports. This modulation occurs irrespectively of which direction the light travels through the device, i.e., the modulator is a bi-directional electro-optic modulator. This can be achieved for example if the modulator is electrically driven as a lumped-element, i.e., if the modulator is sufficiently small for the electric signal delivered to its active elements (phase shifters, electro-absorption sections) to be substantially the same throughout the device at a given time. A travelling wave modulator for example is not a lumped element modulator and typically only functions at the highest targeted modulation rates if light travels in a preferred direction. Examples of lumped element modulators are for example resonant ring modulators, meandered modulators (Mach-Zehnder modulators whose phase shifters are meandered to make them small enough from an electrical perspective to be lumped elements), and certain types of slow light modulators that are sufficiently compact to be lumped elements. Bi-directional slow light modulators may be implemented as resonantly assisted Mach-Zehnder modulators in which several ring modulators are collectively driven according to a single data stream.

Figure 6:
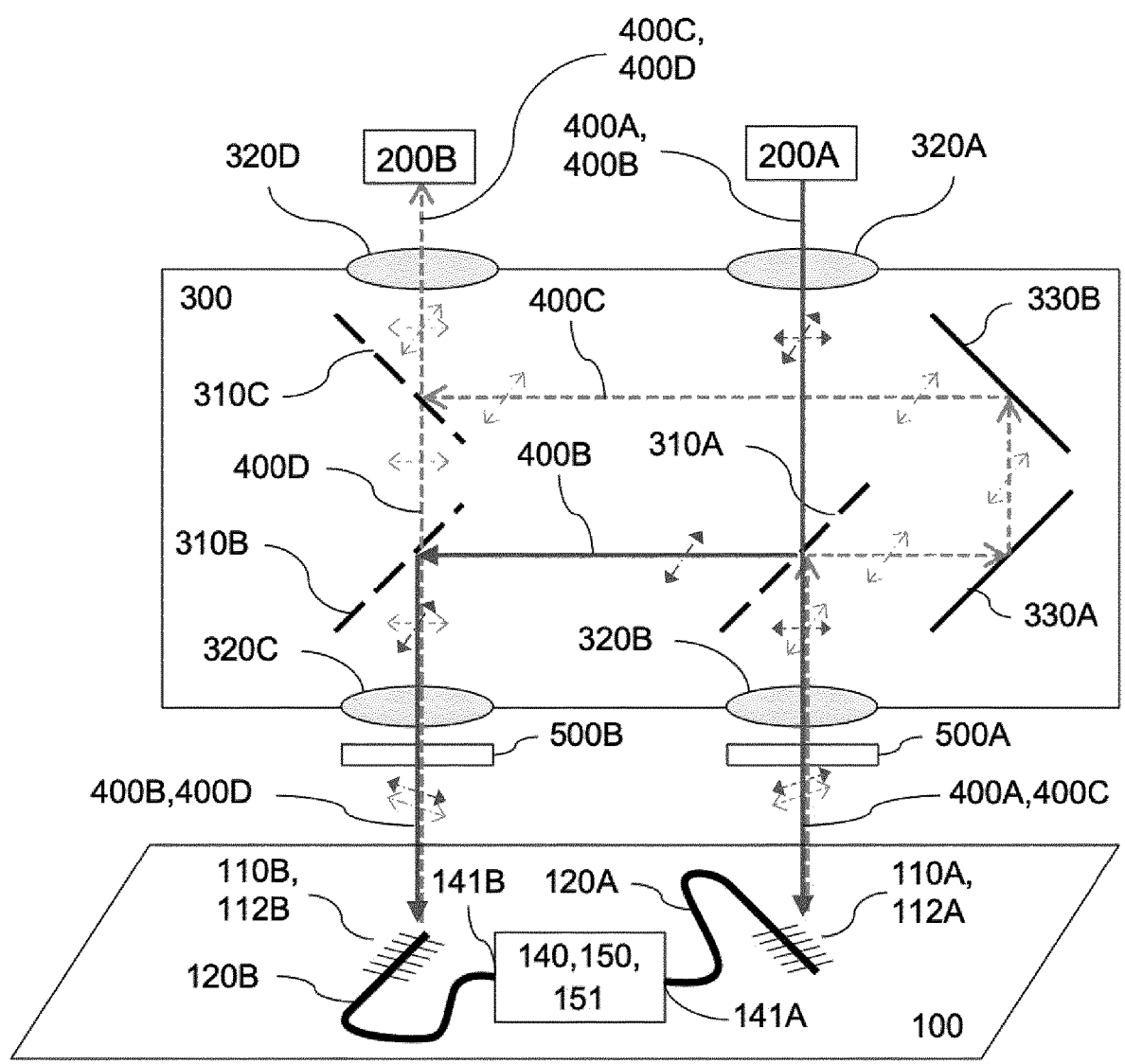
FIG. 6 depicts single mode coupling from a second optical element to a photonic integrated circuit according to aspects of the disclosure.

The glass interposer couples the second and third optical elements [200A] and [200B] to the PIC [100], with the two polarizations arriving from the second optical element [200A] being routed to the respective polarization selective couplers [110A] and [110B] of the PIC, and light emitted from the same two polarization selective couplers of the PIC being routed to the third optical element [200B]. The non-reciprocal polarization rotation of the Faraday rotators [500A], [500B] are required to separate the beam paths of the 2 coupling schemes (second optical element [200A] to PIC [100] and PIC [100] to third optical element [200B]), which are non-reciprocal. The complex functionality required of the glass interposer [300] can be achieved by adding a second layer of polarization selective and/or polarization insensitive reflectors to the glass interposer elements on which the preferred embodiments A, B and C are based. In other words, the complex glass interposer required here can be manufactured by stacking simpler elements and assembling them with each other, as described in more details in the description of manufacturing methods. In FIG. 6, it can for example be seen that one set of reflectors [310A], [310B] and [330A] are on a first level and that reflectors [310C] and [330B] are on a second level stacked above the first. Moreover, in FIG. 6 reflectors [310A], [310B] and [330A] are oriented in one direction, for example −45° relative to the surface normal of the PIC or within +/−20° of that angle, while reflectors [310C] and [330B] are oriented in another direction, for example +45° relative to the surface normal of the PIC or within +/−20° of that angle. Here, +45° and −45° may be interchanged with each other in an equivalent (symmetrized) embodiment.

In the following, the beam path is described according to whether light is polarized along the s- or the p-polarization. In this description, s- and p- can be swapped with each other by reconfiguring the polarization selective reflectors [310] of the interposer [300] and the polarization selective couplers [110A], [110B] (in terms of which polarization is transmitted or reflected/discarded) of the PIC [100], as well as the Faraday rotators [500A], [500B] (in terms of the directions of rotation, i.e., the sign of the rotation angle). In other words, the exact nature of the two polarizations is not essential so long as they be orthogonal to each other. The polarizations shown in FIG. 6 have been exemplarily chosen to enable an implementation with polarization selective reflectors [310] operating in the MacNeille configuration.

The beam path is described as follows: The 2 polarizations of the light coming from the second optical element [200A] are collimated using a first lens [320A] and directed to a first polarization selective reflector [310A]. The p-polarized light is transmitted through the polarization selective reflector [310A] and focused on the first polarization selective coupler [110A] of the PIC [100] using a second lens [320B]. The first Faraday rotator [500A] is located in the beam path of the p-polarized light, for example between the second lens [320B] and the PIC [100], and rotates the polarization by 45°. The direction of rotation of the Faraday rotator [500A] and of the polarization selective coupler [110A] are configured in such a way that this light is coupled into the PIC. The s-polarized light emitted from the second optical element [200A] is reflected by the first polarization selective reflector [310A] towards a second polarization selective reflector [310B] that reflects it again and routes it to a third lens [320C] that focuses it on a second polarization selective coupler [110B] of the PIC [100]. The second Faraday rotator [500B] is placed in the beam path of the s-polarized light and rotates the polarization by 45°. The direction of rotation of the Faraday rotator [500B] and the second polarization selective coupler [110B] are configured in such a way that this light is coupled into the PIC. The path of the light emitted from the second optical element [200A] with p-polarization and routed to the first polarization selective coupler [110A] constitutes a first light beam [400A]. The path of the light emitted from the second optical element [200A] with s-polarization and routed to the second polarization selective coupler [110B] constitutes a second light beam [400B].

The light that enters the PIC [100] through the first polarization selective coupler [110A] is processed by the photonic sub-circuit [140] and exits the PIC through the second polarization selective coupler [110B]. On the other hand, the light that enters the PIC through the second polarization selective coupler [110B] is processed by the photonic sub-circuit [140] and exits the PIC through the first polarization selective coupler [110A].

The light emitted from the second polarization selective coupler [110B] of the PIC [100] is transmitted through the second Faraday rotator [500B] in the reverse direction with its polarization being rotated by another 45° in a non-reciprocal manner, converting it back into p-polarized light. The light is collimated using the third lens [320C] and directed to the second polarization selective reflector [310B]. Here, the light is transmitted and directed to a third polarization selective reflector [310C] where it is transmitted and focused onto the coupling interface of the third optical element [200B] using a fourth lens [320D].

The light emitted from the first polarization selective coupler [110A] of the PIC [100] is transmitted through the first Faraday rotator [500A] in backwards direction with its polarization being rotated by another 45° in a non-reciprocal manner, converting it back into s-polarized light. The light is collimated using the second lens [320B] and directed towards the first polarization selective reflector [310A]. Here, the light is reflected towards a fourth (polarization selective or polarization insensitive) reflector [330A], where it is reflected towards a fifth (polarization selective or polarization insensitive) reflector [330B], where it is in turn reflected towards the third polarization selective reflector [310C], where the light is reflected and again focused onto the coupling interface of the third optical element [200B] using the fourth lens [320D].

The path of the light emitted from the first polarization selective coupler [110A] and routed to the third optical element [200B] constitutes a third light beam [400C]. The path of the light emitted from the second polarization selective coupler [110B] and routed to the third optical element [200B] constitutes a fourth light beam [400D].

In order to better distinguish the light beams [400A], [400B], [400C] and [400D] from each other in FIG. 6, light beams [400A] and [400B] travelling from the second optical element [200A], through the optical interposer [300] and to the PIC [100] are represented with solid arrows with filled arrow heads. Corresponding polarizations are also represented with filled arrow heads. Light beams [400C] and [400D] travelling from the PIC [100], through the optical interposer [300] and to the third optical element [200B] are represented with dashed arrows with open arrows heads. Corresponding polarizations are also represented with open arrow heads.

At a more abstract level, the function of the three polarization selective reflectors [310A], [310B] and [310C] can be described as follows: The first polarization selective reflector [310A] has the function of (i) splitting the incoming beams [400A] and [400B], that are emitted from the second optical element [200A], according to their polarization, sending first incoming light beam [400A] to first polarization selective coupler [110A] and sending the second incoming light beam [400B] to second polarization selective reflector [310B]. It has the second function of (ii) routing first returning beam [400C] from first polarization selective coupler [110A] to third polarization selective reflector [310C]. Second polarization selective reflector [310B] has the function of (i) routing second incoming beam [400B] from first polarization selective reflector [310A] to second polarization selective coupler [110B] and to route second returning beam [400D] from second polarization selective coupler [110B] to third polarization selective reflector [310C]. Third polarization selective reflector [310C] has the function of combining returning beams [400C] and [400D], respectively arriving from the first and second polarization selective reflectors [310A] and [310B], and to route them to the third optical element [200B]. Whether these functions are fulfilled in reflection or transmission mode and whether routing is direct or indirect, for example with additional interposed reflectors [330], is implementation specific and immaterial to the underlying routing diagram of the optical beams.

The function of routing a beam from a first element to a second optical element, and routing another beam returning from the second optical element to a third optical element, is also that of an optical circulator, which is a non-reciprocal device. Thus, together with Faraday rotators [500A] and [500B], polarization selective reflectors [310A] and [310B] each have the functionality of a circulator. In addition, polarization selective reflector [310A] has the function of splitting beams [400A] and [400B] incoming from second optical element [200A].

Polarization selective reflector [310C] has the function of combining returning beams [400C] and [400D] before they are routed to the third optical element [200B].

It is also possible to implement an alternative configuration in which together with Faraday rotators [500A] and [500B], polarization selective reflectors [310A] and [310B] each have the functionality of a circulator as above, but where polarization selective reflector [310A] has the additional function of combining returning beams rather than splitting incoming beams. In this configuration, polarization selective reflector [310C] also has the function of splitting incoming beams rather than combining returning beams. This configuration can for example simply be realized by swapping second and third optical elements [200A] and [200B] with each other in FIG. 6, inverting the direction of all the optical beams, and inverting the direction of rotation of the Faraday rotators to accommodate the inverted paths. Thus, in general two polarization selective reflectors, together with their associated Faraday rotator, each have the function of circulators. One of these two polarization selective reflectors either has the additional function of (i) splitting incoming beams according to their polarization after they have been emitted by second optical element [200A] or of (ii) combining returning beams of opposite polarization before sending them to third optical element [200B]. A third polarization selective reflector has the other one of the two functions (i) or (ii). Thus, four functionalities, i.e., two circulators, a polarization beam splitter and a polarization combiner, are distributed over three polarization selective reflectors [310A]-[310C], with one of them having a dual role of either combining or splitting beams in addition of being part of an optical circulator.

In a preferred embodiment, all the polarization selective reflectors [310A], [310B], [310C] are of the same type (in terms of which polarization is being transmitted or reflected). In a further preferred embodiment, the reflectors [330A], [330B] are also implemented with surface treatments of the same type. This greatly facilitates the manufacturing of the optical interposer, as the same surface treatment (for example a thin-film coating) can be used for all these reflectors. This is possible, since [330A] and [330B] are required to reflect the s-polarization in FIG. 6, same as polarization selective reflectors [310A], [310B] and [310C]. In a further preferred embodiment, the Faraday rotators [500A] and [500B] are of the same type. If both Faraday rotators are oriented in the same way, such that incoming beams [400A] and [400B] are both rotated in the same direction, single polarization grating couplers [112A], [112B] should preferentially be oriented orthogonally (perpendicularly) to each other. If one Faraday rotator is flipped such that one incoming beam is rotated by +45° and the other incoming beam is rotated by −45°, the two single polarization grating couplers should preferentially be oriented parallel or antiparallel to each other.

In this preferred embodiment, bi-directional polarization selective routing is achieved by utilizing polarization selective reflectors on the glass interposer and by orienting or adapting polarization selective couplers on the PIC in combination with Faraday rotators. This way, the bi-directional polarization selective routing functionality is distributed over the PIC and the glass interposer. Since the two polarizations are routed from the second optical element [200A] to two different polarization selective couplers [110A], [110B] on the PIC [100], and light emitted with the same polarizations from the polarization selective couplers [110A] and [110B] are later routed to a different third optical element [200B], the overall system is inherently non-reciprocal and cannot be implemented without one or several Faraday rotators.

Alternatively, a different PIC configuration would enable obtaining the same functionality as shown in FIG. 6, with the same or a similar optical interposer [300], but without requiring Faraday rotators [500A], [500B]. In this PIC configuration, the two polarization selective couplers [110A], [110B] are each replaced by a dual-polarization coupler [170A], [170B]. The photonic sub-circuit [140] is being configured to support both polarizations, i.e., the intended functionality is obtained for light of either polarization. This can be obtained with a photonic component [150] supporting both polarizations, or by splitting polarizations inside the sub-circuit [140] and by duplicating the photonic component [150], with each one of the duplicated components [150A], [150B] processing one polarization. Prior to entering and after exiting one of the components [150A], [150B], the polarization of the light can be rotated and swapped, so that photonic components [150A] and [150B] may be of the same type.

The dual-polarization couplers [170A], [170B] are able to couple (receive) incident light with either polarization into waveguides [120A], [120B], as well as to couple light with either polarization from waveguides [120A], [120B] out of the PIC (emit). Faraday rotators [500A] and [500B] are no longer required and are removed. Orientation of dual-polarization couplers may be adjusted accordingly. In all other aspects, previously described aspects of embodiment D remain applicable. The dual-polarization couplers [170A], [170B] are configured (oriented) in such a way that beam [400A] is coupled into waveguide [120A] with a first polarization and beam [400B] is coupled into waveguide [120B] with a second polarization. Since beams [400A] and [400B] have opposite (orthogonal) polarizations, this may correspond in dual-polarization couplers [170A] and [170B] to share a common orientation.

Light from beam [400A] then propagates from dual-polarization coupler [170A] to port [141A] of sub-circuit [140], from port [141A] to port [141B] of sub-circuit [140], and from port [141B] to dual-polarization coupler [170B]. There, it is emitted from the PIC [100] with a polarization that is orthogonal relative to the polarization of beam [400B] and corresponds to the polarization of beam [400D] in FIG. 6 (and also corresponds to the initial polarization of beam [400A]). This is the case because light from beams [400A] and [400B] has orthogonal polarizations inside the PIC, so that in the absence of non-reciprocal devices such as Faraday rotators [500] it needs also be orthogonal after exiting (being emitted from) the PIC. Similarly, light from beam [400B] then propagates from dual-polarization coupler [170B] to port [141B] of sub-circuit [140], from port [141B] to port [141A] of sub-circuit [140], and from port [141A] to dual-polarization coupler [170A]. There, it is emitted from the PIC [100] with a polarization that is orthogonal relative to the polarization of beam [400A] and corresponds to the polarization of beam [400C] in FIG. 6 (and also corresponds to the initial polarization of beam [400B]). Thus, light emitted from the PIC thereafter follows the same optical paths as depicted in FIG. 6 and as described above, so that it is coupled to the third optical element [200B].

A challenge associated to dual-polarization couplers [170A] and [170B] is that they are required to couple both polarizations to/from a single waveguide [120A] or [120B], as opposed to each coupling light to/from one out of two waveguides depending on the polarization. This functionality can for example be achieved by a 1D diffraction grating (similar to a single polarization grating coupler) from which the two polarizations are emitted with different angles or onto which the two polarizations are incident with different angles. Alternatively, the two polarizations may be emitted from/received by the dual-polarization couplers [170A] and [170B] at different locations of the couplers. Either or both of these then have to be considered in the optical interposer design. Lastly, a grating coupler may be designed to emit/receive both polarizations at the same location and with the same angle, by managing the birefringence inside the grating coupler, for example with subwavelength patterning/structures.

In this configuration of the PIC [100], Faraday rotators [500A] and [500B] are not required as the PIC supports light of both polarizations inside waveguides [120A], [120B] and inside photonic sub-circuit [140]. This provides an extra degree of freedom for the light that determines where it is routed to after exiting the PIC [100] that can be used for routing with reciprocal optical devices. In the previous PIC configuration, this degree of freedom was given only by the direction in which the light travels, as polarization selective couplers [110A] and [110B] receive and emit light with the same polarization. Using the direction of light to determine which path it follows is by definition the property of a non-reciprocal device such as enabled by a Faraday rotator [500].

At a more abstract level, in this alternative embodiment verifying the functionality of embodiment D with dual-polarization couplers, the polarization selective reflectors [310A] and [310B] can be seen to verify the equivalent functionality of a circulator with reciprocal devices, wherein the switched polarization of the forward and reverse paths are used to obtain it (beams [400A] and [400C] have opposite polarizations, beams [400B] and [400D] have opposite polarizations).

This fourth embodiment D may be used to implement massively parallel processing of light in close spatial proximity to an electrical switch core by coupling remote light sources to a PIC [100] using single mode optical fibers [201A] (an instance of the second optical element [200A]) and sending the processed light to the interconnection fiber [201B] (an instance of the third optical element [200B]) that is further routed to downstream electro-optic receivers. In such receivers, a coupling apparatus according to embodiments A or C can be used. Transmitter using coupling apparatus according to embodiment D and receiver using coupling apparatus according to embodiments A or C can be combined in a common PIC, common sub-assembly or common package.

Remoting the light source is highly advantageous when co-packaging optics with electronics dissipating a substantial amount of heat, since lasers lose performance at increased temperatures. Moreover, remoting the lasers and connecting them with fiber(s) allows replacing individual laser diodes when they fail without having to replace the whole switch, when an electrical switch is co-packaged with other parts of the transceiver systems such as the electro-optic modulators. Connecting the remote laser(s) with single mode fiber(s) to the PIC, rather than with polarization maintaining fiber, is highly advantageous as it results in much reduced manufacturing costs. Co-packaging optics with high-speed electronics is highly advantageous, as it circumvents electrical signal attenuation and distortion otherwise occurring in interposed printed circuit board traces. The great difficulty is to couple the light in and out of the PIC in a massively parallelizable and polarization insensitive manner, which is the problem solved here. Assuming a pitch of 250 μm between lenses in one in-plane direction (corresponding to a standard pitch between fibers in a fiber array) and a pitch of 3.5 mm between couplers/lenses in the other in-plane direction (corresponding to the thickness of typical fiber arrays), a total of more than 1000 fibers can be attached to a standard silicon photonics reticle size of 32×30 mm, corresponding to over 500 bi-directional optical links. At current state-of-the-art data rates (50 Gbaud 4-level pulse amplitude modulation corresponding to 100 Gb/s), this would correspond to an aggregate bandwidth of over 50 Tb/s, in line with the data throughput requirements of top-of-the-rack switches in datacenters. Another promising field of application of such a packaging scheme is the massively parallel optical distribution of signals to phased array antennas as anticipated for 5G wireless technology.

In FIGS. 1-6 and 11-13, devices on the PIC [100] are represented as being on the same side (surface) of the PIC on which the interposer [300] or interposer building blocks [600], [700], [800], [900] are being attached. However, surface emitting couplers can also emit/receive light through the back-side of the PIC, opposite to the side on which the surface emitting couplers are fabricated. In that case, interposer [300] or interposer building blocks [600], [700], [800], [900] will also be mounted on the back-side of the PIC. While this may lead to beams emitted by the surface emitting couplers to broaden due to the increased propagation distance travelled through prior to reaching the interposer [300], this can be compensated by the lenses [320A], [320B] built into the interposer without requiring additional structural elements. All configurations described above and in the following can be generalized to surface emitting couplers emitting/receiving light through/from the surface located at the back-side of the PIC, defined as being opposite to the side in which the couplers and further photonic devices are fabricated.

DETAILED DESCRIPTION OF THE
INVENTION (METHOD)

The invention comprises a method for the manufacturing of the previously described embodiments and other devices by assembling a number of identical glass molded building blocks [600] to form glass interposers [300]. More complex glass interposers [300] can be built by assembling different types of building blocks [600], [700], [800], however, the number of different types of building blocks is kept at a minimum in order to facilitate inventory and production. In particular, ways of manufacturing embodiments A-D described above are disclosed in the following.

Figure 7:
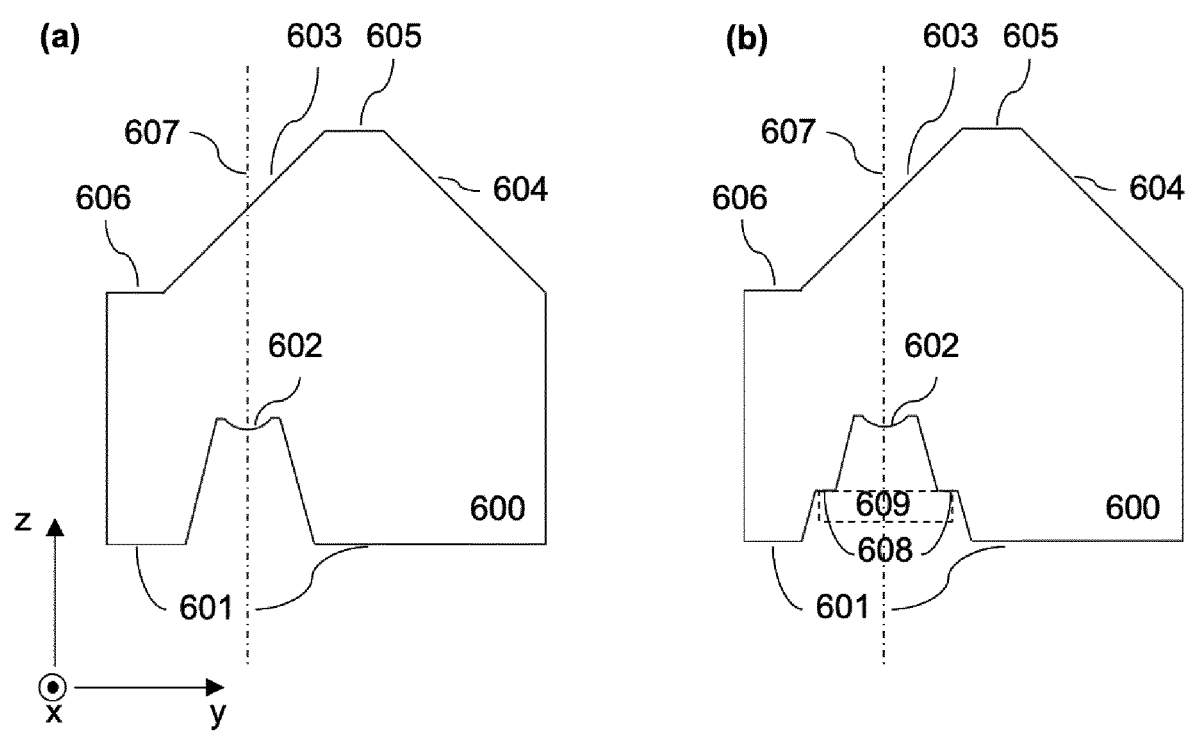
FIG. 7 depicts a first type of building block according to aspects of the disclosure.

A first type of building block [600] is illustrated by FIG. 7. This building block comprises a facet [601] that can be used as a mechanical contact and attachment interface when attaching another optical element such as a PIC [100], laser diode or fiber [201] (or, more generally, the second or third optical element [200], [200A], [200B]), precisely determining the distance from said optical element from a lens [602] as well as precisely determining the angle of the beam emitted/received by the PIC [100] or second or third optical element [200], [200A], [200B] relative to the optical axis of the lens. The building block also comprises two optical facets [603] and [604] that can be surface treated with e.g. a thin-film coating, a grating, a metallization, or any of the other surface treatments described herein to define polarization selective or polarization insensitive reflectors [310], [330], polarization selective filters [310], wavelength selective filters [340] (for example for the implementation of wavelength division multiplexers), or to reduce reflections (anti-reflective coating). Depending on the configurations, optical beams can be reflected, transmitted, scattered or absorbed at these optical facets, in a polarization selective or polarization insensitive manner, as well as in a wavelength selective or wavelength insensitive manner. Features [605] and [606] facilitate manufacturing via glass molding as well as assembly (stacking) of the building blocks and are described below. The optical axis [607] of the lens [602] is shown by a dash dotted line.

In addition, as shown in FIG. 7(b), the building block may have a recess [608] fabricated into the facet [601] forming a space in which an additional optical element [609] such as a Faraday rotator [500], a birefringent plate, a polarizer plate, a dichroic mirror or other wavelength selective device can be inserted, in such a way that rays that transit (propagate) along the optical axis [607] of the lens also transit (propagate) through the inserted optical element [609]. The optical element [609] can for example be attached at the step like feature on the sides of the recess [608] as shown in FIG.

7(b). FIGS. 7(a) and 7(b) show exemplary cross-sections of such a building block [600], without and with a recess [608]. The inserted optical element [609] can also be a wedge or prism shaped element that changes the angle of propagation of a beam due to its non-parallel surfaces. This is for example useful if a PIC [100] is later attached to the facet [601] of the building block, with a surface emitting or receiving polarization selective coupler [110] such as a grating coupler [112] that emits or receives beams at an angle relative to the surface-normal of the PIC. The inserted optical element [609] may then serve to realign the direction of the beam to be substantially parallel to the optical axis [607] of the lens [602], or to displace the axis of the beam, before reaching the lens. Similar considerations hold if the facet [601] is attached to a second or third optical element [200], [200A], [200B] emitting beams at an angle, such as a glass fiber [201] with an end-facet polished at an angle.

In a preferred embodiment, the facet [601] is perpendicular to the axis [607] of the lens [602]. In a second preferred embodiment, the facet [601] is angled no more than 20° with respect to the plane perpendicular to the axis [607] of the lens [602]. In a preferred embodiment, the first optical facet [603] is angled −45° with respect to the axis [607] of the lens [602], or within +/−20° of that angle. In a preferred embodiment, the second optical facet [604] is angle +45° with respect to the axis [607] of the lens [602], or within +/−20° of that angle. Positive angles are in the anti-clockwise direction and negative angles are in the clockwise direction. The axis between the center points of the 2 optical facets [603], [604] can be perpendicular to the axis [607] of the lens [602].

Figure 8:
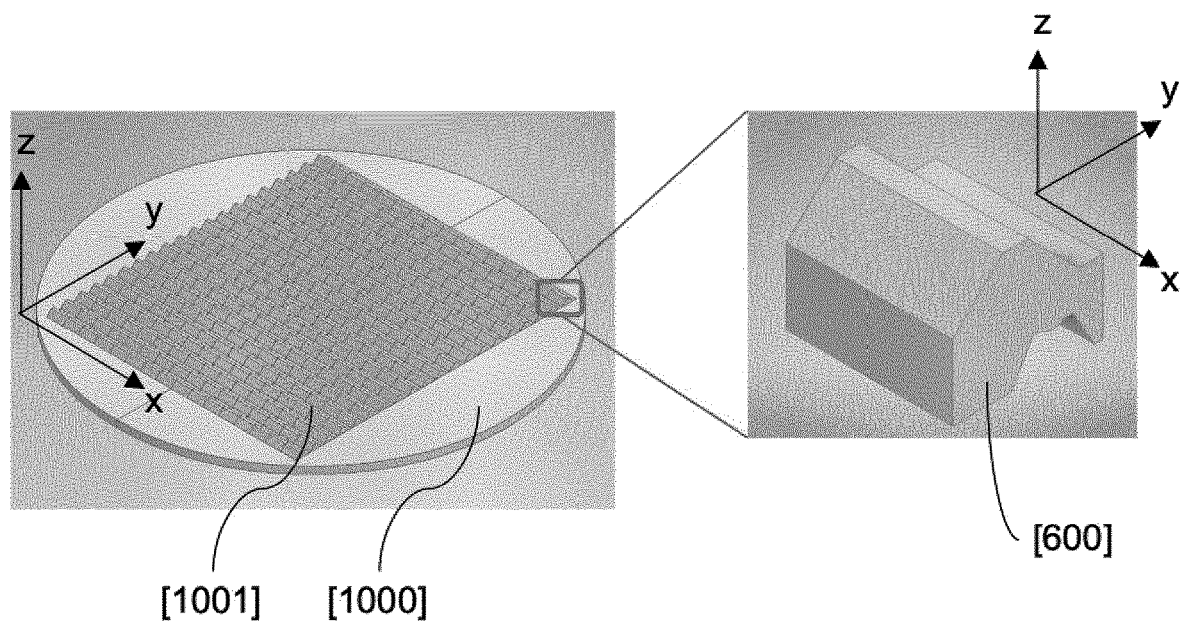
FIG. 8 depicts a single glass-molding process according to aspects of the disclosure.
Figure 19:
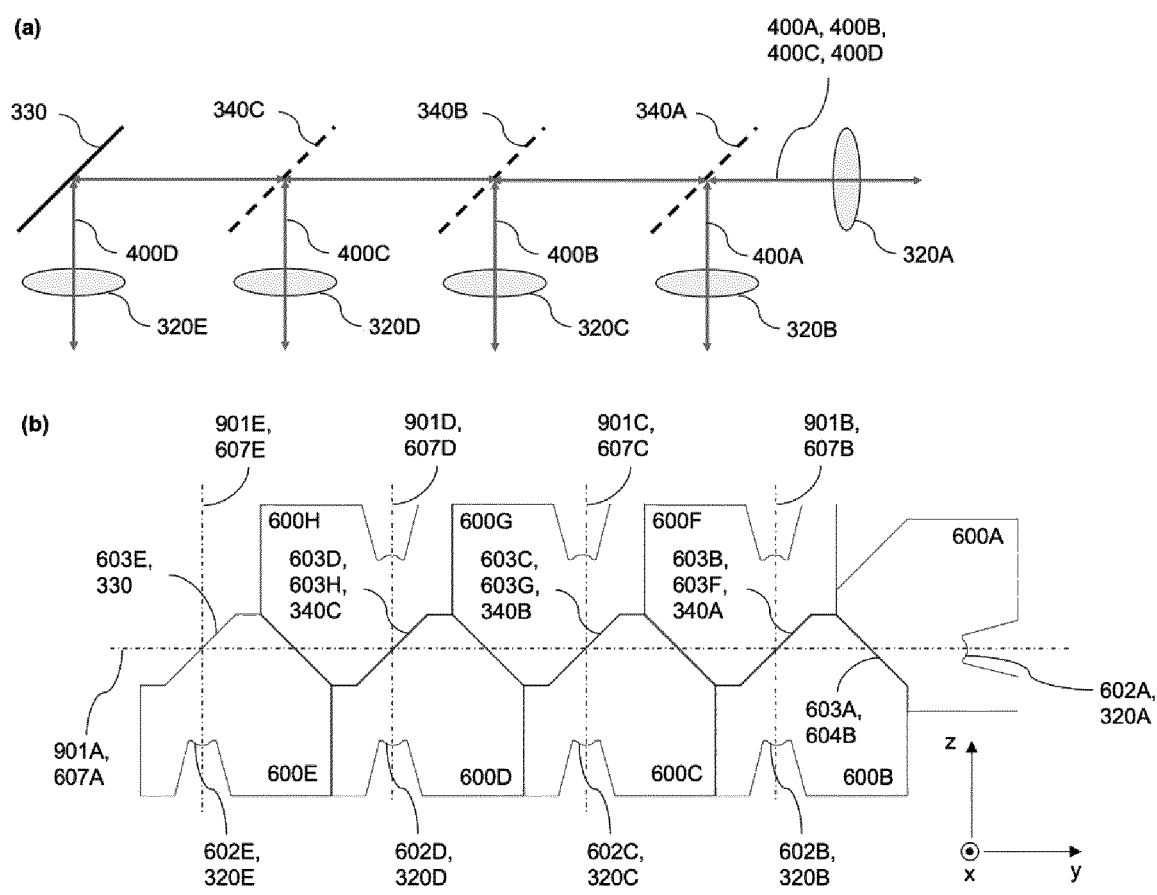
FIG. 19 depicts four additional building blocks to create additional internal reflective facets according to aspects of the disclosure.
Figure 20:
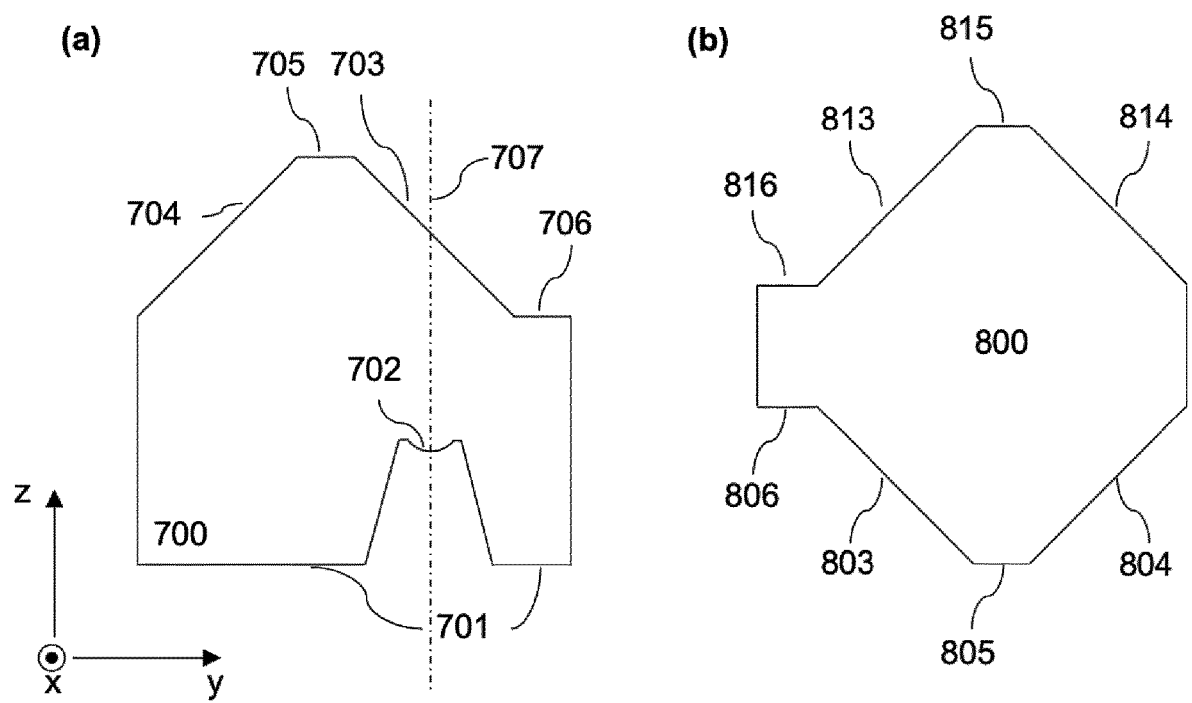
FIG. 20 depicts building a compound building block according to aspects of the disclosure.

The building block can be fabricated using a glass molding process, preferably by molding several identical or different building blocks on a plate-like (wafer-shaped) glass preform [1000] whose bottom and top surfaces have been previously polished to ensure optical grade surface quality. The building block [600], [700], [800] can be repeated on the mold(s) as a 2D array [1001] of the base structure, realizing multiple copies of the same building block on a (glass-)wafer scale with a single glass-molding process, as shown in FIG. 8. These building blocks can then be later singulated as individual building blocks or as groups or smaller arrays of building blocks, for example when arrays of coupling structures are required for parallel optics transceivers (e.g., parallel single mode PSM-transceivers) or for optical devices with multiple input and/or multiple output fibers such as optical switches and routers. Preferred pitches of the building blocks along the x-axis, as shown in FIGS. 7-22, corresponding to one of the axes parallel to the wafer surface and to the out-of-plane axis relative to the building block cross-sections shown in FIGS. 7 and 20, are 250 μm or 127 μm, as these correspond to the pitch between fibers of standard fiber arrays. The building blocks are molded using 2 molds [1201A] and [1201B], with one mold forming the attachment interface [601], the lens [602], and optionally the recess [608], while the second mold forms the first and second optical facets [603] and [604], as well as the features [605] and [606].

In FIG. 7, at the place where the two optical facets [603] and [604] would otherwise merge, an additional small facet [605] is provided. This facilitates molding of the building block, as otherwise a sharp cusp would form where the two facets [603] and [604] would merge. Such sharp features are very difficult to manufacture with glass molding and would result in poor yield as well as a faster deterioration of the molds, reducing the number of molding steps they can be used for. In order to allow stacking and assembly of the building blocks to form composite building blocks [900], a corresponding, complementary feature [606] is provided at either the base of optical facet [603] or [604]. In FIG. 7, this complementary feature [606] is also shown as a small facet, that may be of equal width (in the y-direction, as indicated in the figure) as the facet [605]. As described in the following, features [605] and [606] can also provide mechanical contacts, guiding the precise positioning of building blocks relative to each other when building a composite building block [900].

Figure 9:
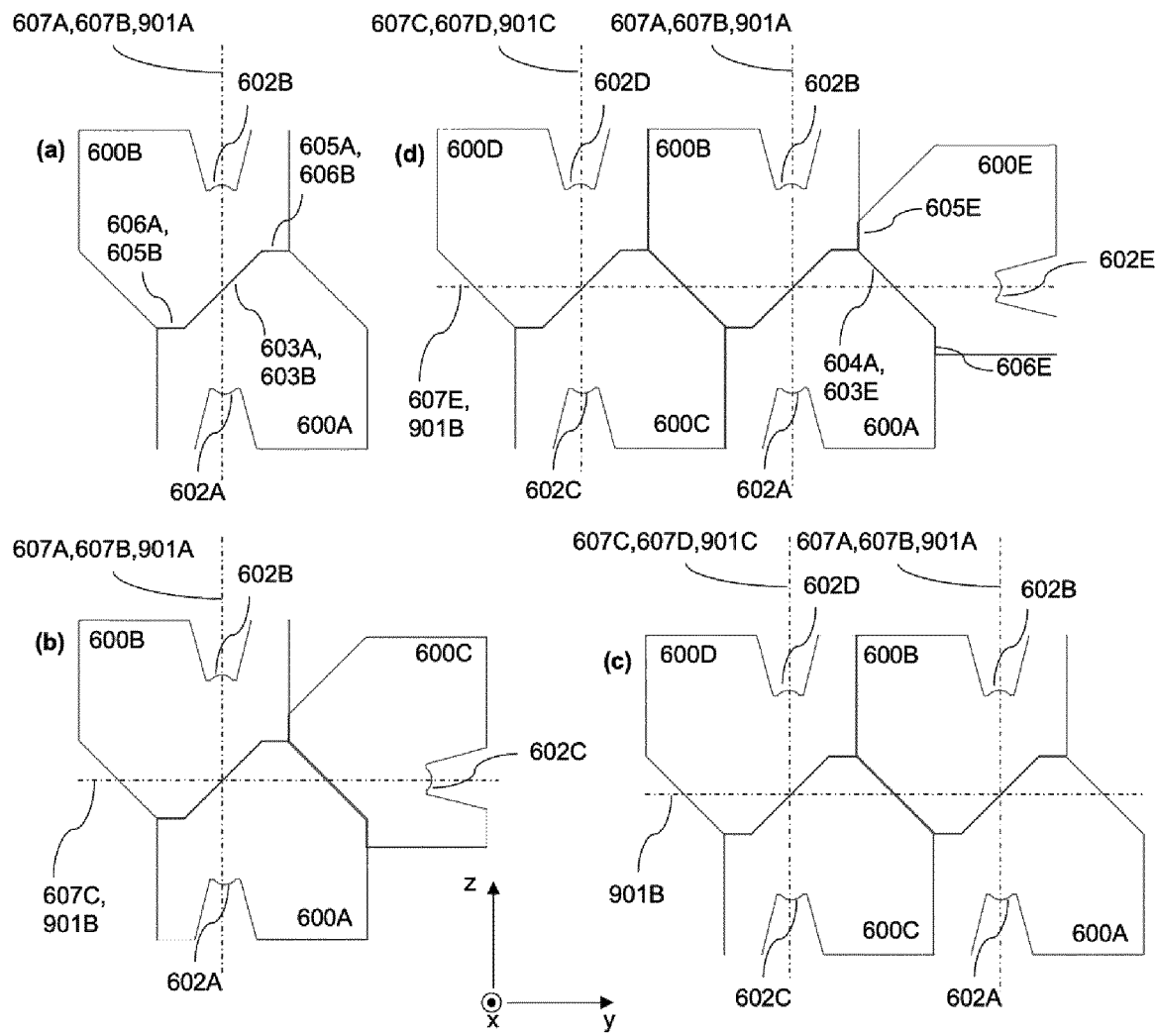
FIG. 9 depicts different forms of stacking according to aspects of the disclosure.

Building blocks as described above may be assembled with further building blocks of the same or of a different type to achieve the targeted functionality in a composite building block [900]. In the following, individual building blocks forming a composite building block as well as their corresponding features are identified by letters A, B, C, D etc. (in FIGS. 9-22). Composite building blocks enable for example inner surfaces of the assembled interposer [300] to be surface treated. They also enable the formation of complex shapes that would be difficult or impossible to directly form with a single molding process. For example, the formation of two lenses oriented perpendicularly to each other as depicted in FIG. 9(b), in which lenses [602A] and [602C] are oriented perpendicularly to each other, would be very difficult to manufacture in a single molding process and would detrimentally affect yield even if possible. Moreover, the treatment of an inner surface such as [603A], [603B] in FIGS. 9(a)-9(d) of a composite building block [900], i.e., as formed by bringing together facet [603A] of building block [600A] with facet [603B] of building block [600B], would be impossible if the entire interposer was formed by a single molding process. Relying as much as possible on building blocks of an identical type facilitates inventory and will thus result in a reduction of manufacturing cost.

In a preferred embodiment, assembly of building blocks is done by means of an epoxy or a thermo-paste based gluing process, wherein epoxy may be thermally or UV-cured. In another preferred embodiment, this assembly is made by means of welding. Metal coatings are deposited on part or all of the surface of building blocks, with spatial selectivity achieved for example by shadow masking, after which molded glass building blocks can be directly welded with each other to form a composite building block. The welding process may be a laser welding process, thermal welding process, or a current induced welding process. Epoxies or other materials used for assembly, when in the beam path, will typically be transparent at the targeted wavelength(s) and index matched to the material out of which the individual building blocks are made, to minimize optical losses due to absorption or internal reflections inside the interposer.

Facets of building blocks drawn as touching each other in the following diagrams or referred to as being brought together may be in direct mechanical contact with each other (after application of surface treatments, e.g., thin-film coatings and inscribed gratings may be in direct mechanical contact with each other or in direct mechanical contact with an untreated surface of the other building block). They may also be separated by a thin layer of bonding material such as cured epoxy. While it could also be in principle possible to have a small void in between the facets, this is typically undesirable when in the beam path, since the interfaces would feature substantial refractive index discontinuities leading to high reflections, that would further be subject to high variability unless the width of the voids is very precisely controlled.

The building block [600] as described above allows different forms of stacking, as shown in FIG. 9. It should be noted that there are several permutations possible for building block [600], since the feature [606] may be positioned at the base of facet [603] (as depicted) or at the base of facet [604]. Moreover, the lens [602] may be positioned such that its optical axis [607] cuts either the facet [603] or the facet [604], preferentially at its midpoint in the y-z plane. The figures are based on one such configuration (feature [606] at the base of facet [603] and optical axis [607] cuts facet [603] at its midpoint), but the following composite building block configurations are also applicable to the other permutations of building block [600].

FIG. 9(a) depicts a configuration in which two building blocks [600A] and [600B] are being assembled such that their respective facets [603A] and [603B] are brought together. In this compound building block, facets/features [606A], [605B] are also brought together. The same holds for [605A] and [606B]. It can thus be seen how the features [605], [606] of the building blocks [600] can act as mechanical alignment features, as they prevent sliding along the contact interface at the junction of [603A] and [603B]. Moreover, the optical axes [607A] and [607B] of lenses [602A] and [602B] can be seen to coincide. Together, they form an optical axis [901A] of the compound building block [900]. In order for the optical axes of the two lenses to coincide, the position of the lens [602] of building blocks [600] may be chosen such that its optical axis [607] crosses the facet [603] at the midpoint of facet [603] in the y-z plane, as depicted in FIGS. 7 and 9.

Lens [602A] of building block [600A] and lens [602B] of building block [600B] can be seen to be at opposite surfaces of the composite building block, i.e., they are rotated 180° relative to each other. Their optical axes [607A] and [607B], as oriented from the lens surface towards the inside of the building block, may be oriented 180° relative to each other or within +/−20° of that angle.

FIG. 9(b) shows another configuration, in which an additional building block [600C] is added to the composite building block. This may for example provide an additional lens [602C] with an optical axis [607C] orthogonal to the axis [901A] or within an angle of +/−20° from said direction. The axis [607C] forms an additional optical axis [901B] of the compound building block [900]. It crosses the facets [603A] and [603B] at their midpoint, at the same point where optical axis [901A] is also crossing them. This is a required condition for facets [603A] or [603B] to act as a mirror sending beams from lens [602C] to [602A] and vice-versa. In order to obtain this configuration, facet [603C] of building block [600C] is brought together with facet [604A] of building block [600A]. Facets [605C] and [606C] of building block [600C] are respectively brought together with side facets of building blocks [600B] and [600A], that may have been formed during singulation of the building blocks (for example, with dicing). Not all facets have been labeled in FIG. 9 in order not to overload the figure, even when referenced here in the text. However, they can be easily identified based on the labeling in FIG. 7, as all the building blocks shown in FIG. 9 are of the same type.

Lens [602A] of building block [600A] and lens [602C] of building block [600C] can be seen to be oriented 90° relative to each other. Their optical axes [607A] and [607C], as oriented from the lens surface towards the inside of the building block, may be oriented +90° or −90° relative to each other or within +/−20° of these angles.

Building block [600B] may be omitted from the composite building block shown in FIG. 9(b) if the intended functionality is to route beams between lenses [602A] and [602C] via a reflector formed by facet [603A] (with or without surface treatment), in particular if the reflector is intended not to be polarization or wavelength selective. Indeed, for a glass refractive index above 1.4142 and if facet [603A] is angled by 45° relative to the optical axes [901A], [901B] as described above, total internal reflection is obtained, so that a reflector would be obtained at the glass-air interface even without surface coating. This, however, also makes it difficult to implement a polarization or wavelength selective reflector at the facet [603A] without building block [600B]. While polarization selectivity could still be obtained for example with a metal grating, easier to manufacture thin-film coatings would not work, as both polarizations would be reflected at the air interface due to total internal reflection, irrespectively of the thin films that have been deposited. Thus, in order to implement wavelength or polarization selective reflectors [340],[310], it may be beneficial to include building block [600B] to prevent the high index contrast to air. In such a case, the lens [602B] might not have a function. It may still be advantageous to build the compound building block [900] by assembling three building blocks [600] of the same type, to reduce the number of different piece parts involved in the manufacturing process. In that case, light does not reach the lens [602B] of building block [600B] under normal operation and the lens is thus not required. However, it may also be beneficial to replace building block [600B] by a building block having all the same features with exception of the lens. Since the lens has the finest features, molds including the lens will be more expensive and undergo faster degradation, limiting the number of molding steps a given mold can be used for. Thus, building blocks with the lens will be more expensive to manufacture than building blocks without the lens once a critical production volume has been reached. If [600B] is not present or does not include a lens, [901A] is simply given by [607A]. These considerations also hold for other configurations described below when building blocks including a lens are depicted where no lens is functionally needed.

FIG. 9(c) describes a further configuration in which two additional building blocks, [600C] and [600D], have been added to the configuration shown in FIG. 9(a). As previously, the lens in [600D] might have a function or not. In the latter case, the building block [600D] might be there to remove the high index contrast to air at the facet [603C]. The line joining the two points where the optical axis [607A] of lens [602A] crosses facet [603A] and where the optical axis [607C] of lens [602C] crosses facet [603C] forms the second optical axis [901B] of the compound building block [900]. The optical axes [607C] and [607D] of lenses [602C] and [602D] coincide when present and form a third optical axis [901C] of the compound building block [900]. If [600D] is not present or does not include a lens, [901C] is simply given by [607C]. A beam can for example be routed from lens [602B] to lens [602A] by following axis [901A], or from lens [602B] to [602C] by following axis [901A] to facets [603B], [603A], reflecting to axis [901B] and following it to facets [603C], [603D], reflecting to axis [901C], and following it to lens [602C].

Since in the configuration shown in FIG. 9(c), building blocks [600A] and [600C], as well as building blocks [600B] and [600D], remain side by side as initially fabricated on the wafer [1000] in an array [1001], they do not need to be singulated into individual building blocks prior to assembly, but may remain in blocks of two (or more) building blocks. This facilitates assembly of the compound building block, as less piece parts need to be manipulated.

FIG. 9(d) shows a configuration building on configuration 9(c), to which an additional building block [600E] is added to provide a lens at a right angle to the other lenses, similarly to the building block that was added in 9(b) to configuration 9(a). The optical axis [607E] of lens [602E] coincides with the optical axis [901B] of 9(c). Together, they form the new optical axis [901B] of configuration 9(d). A beam can for example be routed from lens [602E] to either one of lenses [602A] or [602C], first following optical axis [901B]. A reflection towards axis [901A] at facets [603A], [603B] will lead the beam to be routed to lens [602A]. A reflection towards axis [901C] at facets [603C], [603D] (if present) will lead the beam to be routed to lens [602C]. As previously, such reflections can be dependent on polarization or wavelength.

Figure 10:
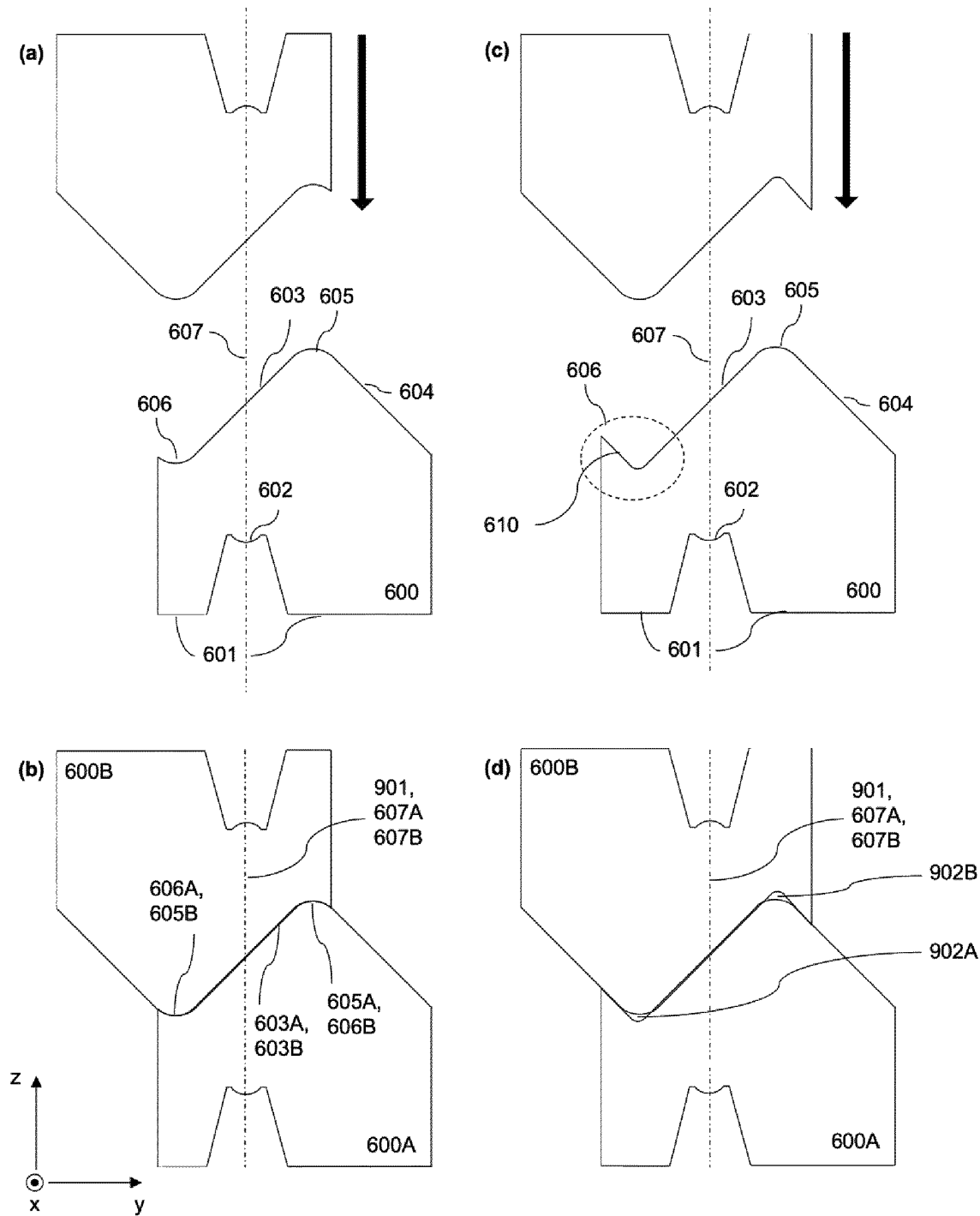
FIG. 10 depicts features that are not straight facets according to aspects of the disclosure.

Features [605] and [606] do not need to be straight facets, particularly if vertical stacking is primarily intended. This is shown in FIG. 10. They can also consist of multiple facets or curved features, i.e., they can also comprise rounded elements, to facilitate manufacturing, as any type of sharp feature at the junction of different facets can be more difficult to manufacture. FIG. 10(a) shows a version of the building block [600] in which the features [605] and [606] have been replaced by rounded features, such as an arc of circle or elliptical feature, but remain complementary to each other in that one has the inverted shape of the other. In FIG. 10(b) it can be seen that when two building blocks [600A] and [600B] are assembled such that their facets [603A] and [603B] are brought together, their features [605A] and [606B], as well as their features [606A] and [605B], are also brought together, without the formation of a void in between. Alternatively, even more material can be removed at one or both of the features [605], [606] as shown in FIG. 10(c), such that voids [902A] and [902B] are respectively formed in between features [606A], [605B] and in between features [605A], [606B] when the compound building block is assembled, as shown in FIG. 10(d). These voids can be filled by air, vacuum or other materials, but will not mechanically prevent stacking of the building blocks. Moreover, features [605] and [606] can be formed such that they continue to act as mechanical guides for the assembly of the compound building block [900]. For example, in FIG. 10(c), feature [606] comprises an additional facet [610] opposite to facet [603] that fulfills this role. When attaching building blocks [600A] and [600B] to each other with epoxy or with other bonding materials, the voids can serve to store excess epoxy or bonding material without negatively impacting the optical functionality of the composite building block, as light beams do not cross these regions. Features are referred to as being complementary to each other here if they enable stacking of building blocks such that optical facets meant to be brought together can be seamlessly brought together without the creation of voids between optical facets at locations crossed by an optical beam.

The optical facets of the building block can be coated with a single layer (including metals) or a stack of thin films (in particular dielectric films) to implement polarization selective reflectors or filters [310], polarization insensitive reflectors [330], anti-reflective coatings or wavelength selective reflectors [340] (for the implementation of wavelength division multiplexed systems). Alternatively, 1D or 2D gratings may also be inscribed into the facets, which also allows the implementation of polarization selective reflectors or filters [310] as well as wavelength selective reflectors [340]. These surface treatments can be implemented at the glass-wafer level for all facets of all building blocks at once or for a predefined number of facets/for predefined areas only. In a preferred embodiment, this can be achieved by using an appropriate masking technique during the deposition of the coating layer(s). Conventionally, this might be done with the selective removal of a resist layer by optical lithography (for example with the lift-off technique). Since fine features as enabled by optical lithography are not typically required for the surface treatments by thin film deposition, typically applied to broad areas, shadow masking by overlaying of a reusable mechanical mask over the molded glass wafer (or over a PIC wafer on which glass building blocks have been mounted) during deposition might be much more cost effective and is therefore a preferred method. In a second preferred embodiment, this can also be achieved by wafer level deposition and subsequent removal of the thin-film coating in predefined facet areas using an appropriate etch process and masking technology.

In a preferred embodiment of the manufacturing method, the assembly of the building blocks is performed at the wafer scale, i.e., a number of building blocks are left attached to each other prior to assembly, either as the whole manufactured molded glass-wafer or as a block containing at least several building blocks that will undergo assembly together prior to singulation/further dicing. Further elements can be attached to this wafer or piece of wafer either as singulated building blocks, or groups of building blocks still attached to each other. Since the position of building blocks relative to each other is very well defined prior to singulation, this facilitates assembly processes such as pick-and-place assembly. Moreover, this way alignment fiducials may be provided on the wafer or piece of wafer that do not need to be repeated for each individual building block, thus saving space and material.

After assembly, interposers or interposer sub-assemblies as shown in FIGS. 7, 9, 10 and 14-21 can be either singulated into individual interposers fulfilling the functionalities as previously described, or into 1D or 2D arrays of such interposers that are still attached to each other and that can be transferred together and attached to a PIC or other optical elements. This facilitates placement of the interposers. For example, alignment fiducials may be shared for an entire array. Moreover, in case of active alignment, it will be sufficient to ensure that at least two interposers are properly aligned to guarantee the entire 1D or 2D array to be properly aligned.

As for the assembly of the building blocks into compound building blocks or complete glass interposers, assembly of glass interposers onto PICs can also be done prior to complete or partial dicing of a wafer on which the PICs are fabricated, i.e., prior to singulation of the PICs. The PICs can be fabricated in silicon photonics technology and the interposers attached to the silicon photonics wafer.

Figure 11:
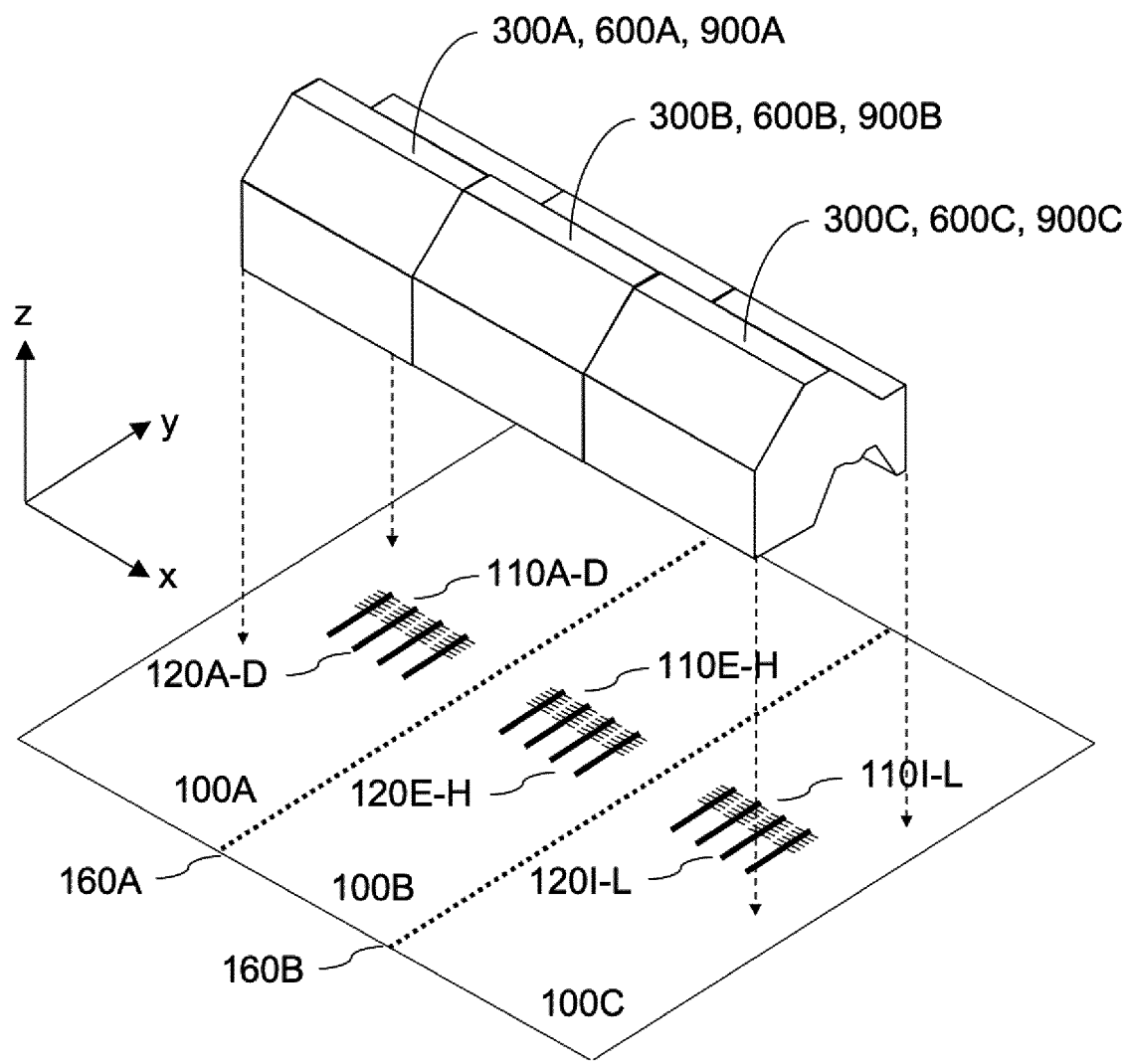
FIG. 11 depicts photonic integrated circuits fabricated in silicon photonics technology and interposers attached to silicon photonic wafers according to aspects of the disclosure.

This is conceptually shown in FIG. 11. Three PICs [100A]-[100C] are still attached to each other. Each has four surface emitting couplers and require an optical interposer [300] with a cross-section along a y-z plane that could for example correspond to any of FIGS. 7, 9, 10, 14-21. Each interposer [300] has 4 bottom-lenses [320] sending or receiving light to/from one of the four surface emitting couplers [110] (see also FIG. 13). Several options exist for attaching the interposers [300A]-[300C] to the PICs [100A]-[100C]. They can either be assembled at the (glass-)wafer scale, left attached to each other (not singulated) and transferred together to the three attached PICs, after which the PICs and optical interposers might be diced together. Alternatively, the optical interposers can be assembled at the glass-wafer scale, singulated, and individually transferred to the three attached PICs, after which the PICs are singulated. Finally, the optical interposers can also be transferred one by one to already singulated PICs. However, assembly at the wafer scale is typically more efficient in large volumes.

Instead of transferring fully assembled interposers [300A]-[300C] to the attached PICs, it is also possible to transfer and attach building blocks [600A]-[600C] or composite building blocks [900A]-[900C] to a group of attached PICs and do further processing such as surface treatments and further build-up of building blocks prior to singulation of the PICs. For PICs fabricated in silicon photonics technology, this has for example the advantage that process steps such as surface treatments can be done on 300 mm wafers, allowing parallel processing of a large number of optical subassemblies. Since glass preforms are currently much smaller than silicon wafers, this increases the scale for individual process steps such as surface treatments.

Figure 12:
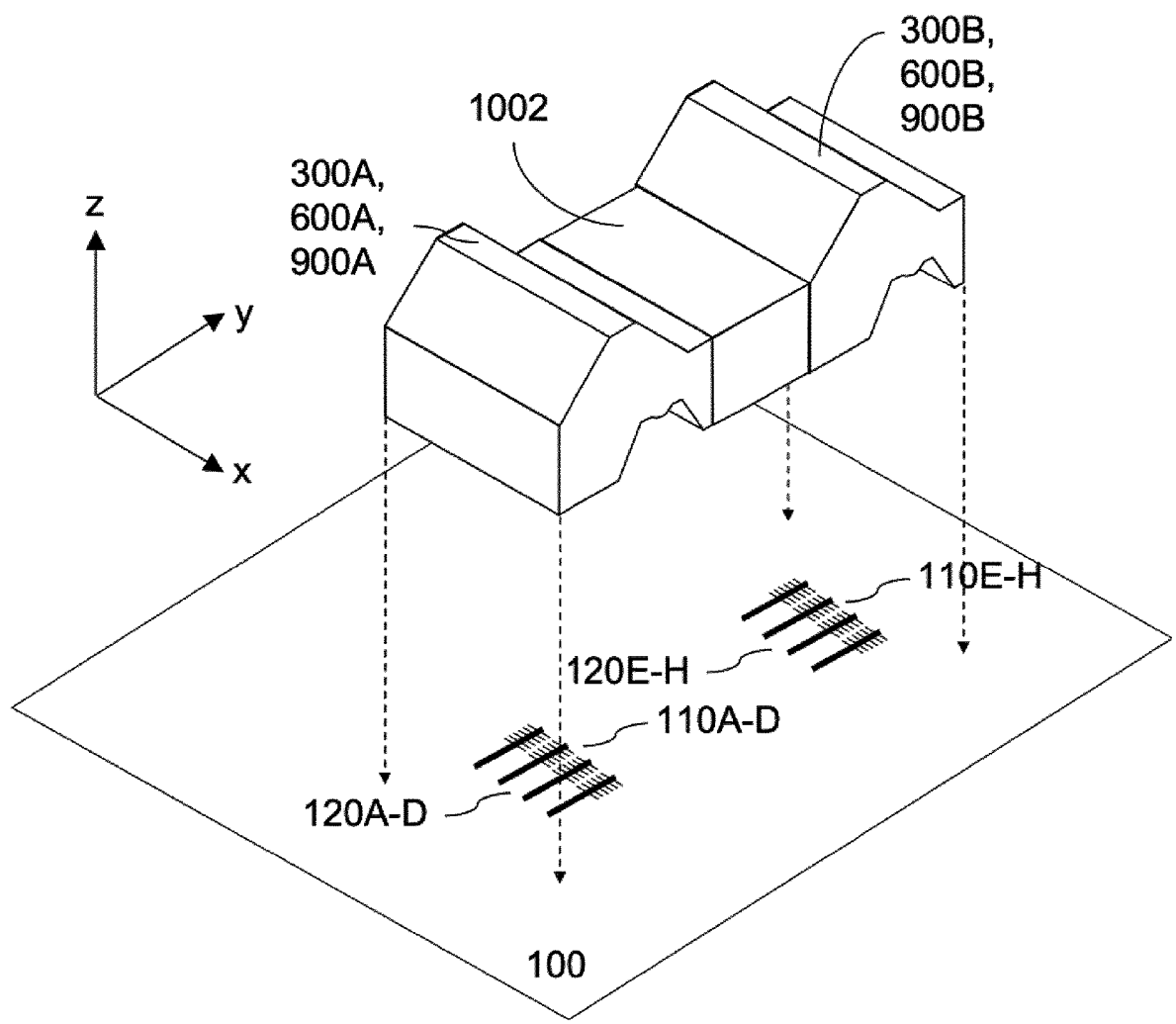
FIG. 12 depicts arrays in a y-direction closed packed on a glass wafer but assembled with a larger pitch on the photonic integrated circuit according to aspects of the disclosure.

Maintaining arrays at least in the x-direction, perpendicular to the plane of drawings in FIGS. 7, 9, 10 and 14-22, is advantageous, as the pitch of these arrays could be made to directly match the pitch of standard fiber arrays. 2D arrays in which interposers also remain attached to each other in the other in-plane wafer direction, given by the y-axis in FIGS. 7-22, would be advantageous from an assembly perspective, but might waste a substantial amount of glass-wafer surface if the interposers are constrained to be separated by a much larger distance in that direction due to the thickness of fiber arrays. Thus, it might also be advantageous to rather cingulate the arrays in the y-direction, that can then be close packed on the glass wafer but assembled with a larger pitch on the PIC. This is shown in FIG. 12 in which building blocks [600A], [600B], composite building blocks [900A], [900B], or fully assembled interposers [300A], [300B] are transferred to a PIC or to a group of attached PICS before being singulated from each other along a cut-line along the x-direction. Since the pitch in the y-direction between groups of surface emitting couplers [110A]-[110D] and [110E]-[110H] is larger than the width of the building blocks or interposers (along the y-direction), an additional spacer [1002] has to be fabricated to match the pitch on the interposer side. This results in waisted material and glass-wafer area. If the building blocks or interposers are singulated before being transferred, the spacer [1002] is not required and glass-wafer area can be saved.

Figure 13:
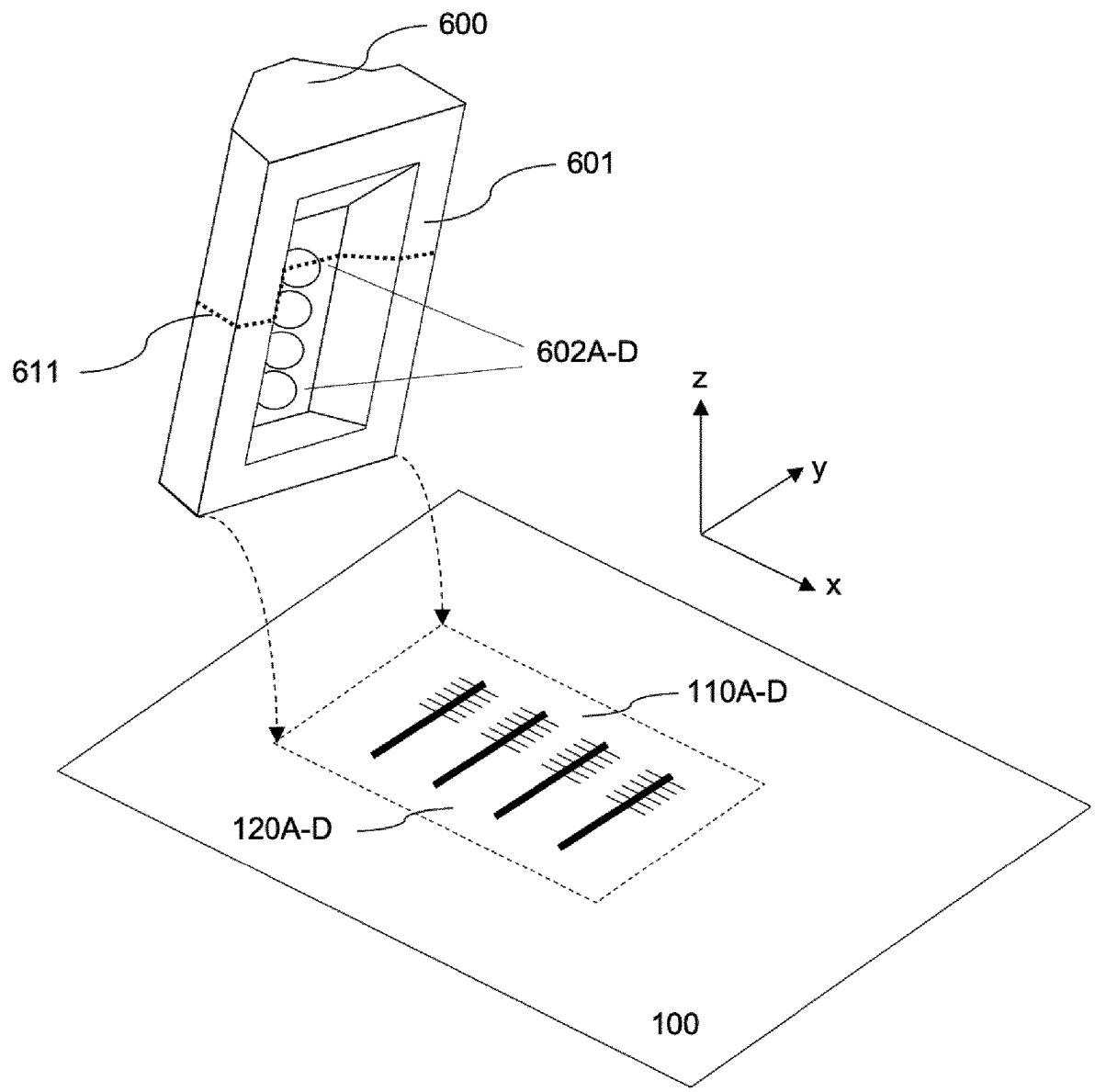
FIG. 13 depicts sealing a cavity formed between a lens and a photonic integrated circuit according to aspects of the disclosure.

When attaching a building block [600] or a composite building block [900] comprising a building block [600] to a PIC [100] or to another optical element [200], [200A], [200B], a mechanical contact facet/attachment interface [601] of the building block [600] can also be used to seal part of the surface of the PIC [100] or other optical element [200], [200A], [200B], as well as a lens [602] of the building block [600] from the environment. In particular, the area below the lens [602] of the building block [600] can be kept in vacuum or modified atmosphere (for example an $N_2$ atmosphere or different inert atmosphere containing reduced levels of oxygen) by ensuring that the facet [601] completely surrounds the area below the lens [602] and that the bonding material/solder is applied to the facet [601] so as to also completely surround the area below the lens [602], effectively sealing the cavity formed between the lens and the PIC [100] (FIG. 13). This is for example useful if a laser is also present in the cavity formed by the glass interposer, that may have been added to the PIC by e.g. flip-chip attachment. The seal can also prevent dust to enter the cavity. This protects for example surface emitting couplers (e.g., [110A]-[110D] as shown in FIG. 13) as well as lenses [602A]-[602D] from dust.

While the manufacturing methods described here enable the fabrication of the interposers described above, they also allow the fabrication of different types of interposers such as for example the simpler single mode fiber attachment interposer shown in FIG. 1, that enables attachment of a second optical element [200] to a PIC [100] but does not feature polarization management or isolation. It can also be used to fabricate an interposer such as shown in FIG. 19, in which wavelength division multiplexing is implemented rather than polarization management, by utilizing dichroic mirrors or other wavelength selective reflectors rather than polarization selective reflectors. Such wavelength selective reflectors [340] can also be fabricated by surface treatments as described above.

Conventional alignment fiducials defined in the glass building blocks can be difficult to use to verify the alignment/overlay of the building blocks with other structural elements such as a PIC, since the building blocks are preferentially fabricated out of glass, that is transparent. One possibility is to use the fact that features fabricated into the glass, such as e.g. a lens, can deform patterns located on the other side (below) of the building block if visualized (imaged) through (from above) the building block. For example, an array of lines, squares, crosses or other alignment fiducials defined on the PIC will be deformed if visualized through a lens or other formed surface of a glass building block forming an optical element depending on its alignment with the PIC. A straight line intersecting the optical axis of a lens will for example still be imaged as a straight line, while a straight line located on the side of the optical axis of the lens may be imaged as a curved line due to deformation created by an imperfect lens. Obtaining a straight line can be used as a criterion for proper alignment. In order to obtain proper alignment in both the axes parallel to the PIC surface, lines in two directions, that may form a cross but may also be different lines under different lenses (or more generally under different optical elements of the glass building block), may be used. Thus, deformation of an alignment fiducial visualized through a glass building block [600], [700], [800], a compound building block [900] or a complete interposer [300] can be used as a criterion to align the glass building block [600], [700], [800], the compound building block [900] or the complete interposer [300] relative to a PIC [100] on which the alignment fiducial is defined.

Alternatively, a lens or other optical element of a glass building block can be used to image a line, cross, or other alignment fiducial on the PIC surface. If the alignment fiducial is centered relative to the lens, i.e., on its optical axis, the generated real or virtual image will remain aligned in a predefined manner relative to surrounding alignment fiducials not imaged through the lens. These surrounding alignment fiducials may rather be imaged through planar surface(s) of the building block, compound building block or interposer, with said surfaces preferentially parallel to the surface of the PIC. If, on the other hand, the lens, and thus the building block, compound building block or interposer, are displaced relative to the imaged alignment fiducial, the real or virtual image generated by the lens will be displaced relative to surrounding alignment fiducials not imaged through the lens. Thus, the relative alignment between alignment fiducials imaged through the lens or other optical element of a glass building block [600], [700], [800], a compound building block [900] or a complete interposer [300] relative to fiducials not imaged through the lens or other optical element can be used as a criterion to align the glass building block [600], [700], [800], compound building block [900] or complete interposer [300] relative to the PIC [100] on which the alignment fiducials are defined. The optical element of the glass building block through which the alignment fiducials of the PIC are imaged can be as simple as a slanted facet, that also leads to a displacement of the imaged alignment fiducial.

Figure 14:
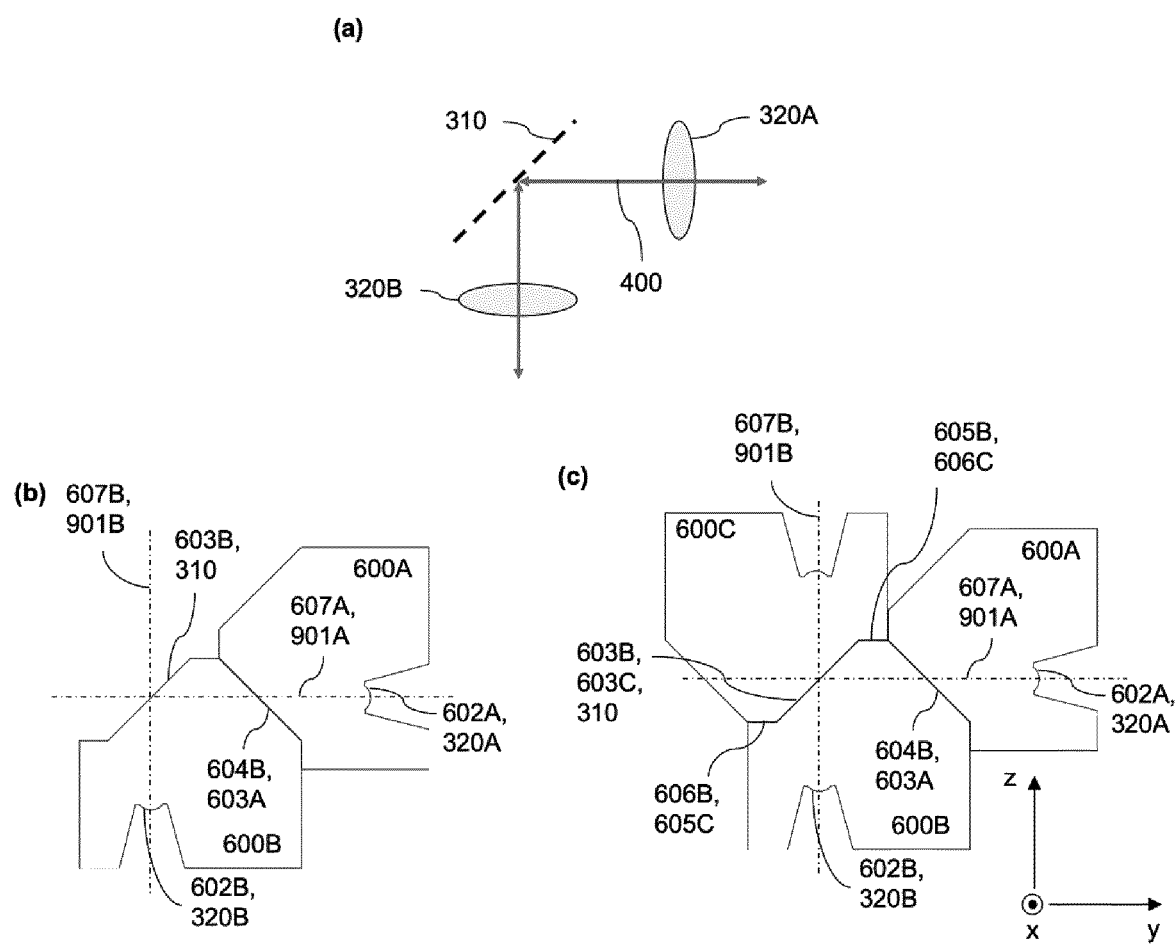
FIG. 14 depicts building a compound building block according to aspects of the disclosure.

In the following, the application of the manufacturing method to the fabrication of preferred embodiments A to D, as well as to an optical interposer incorporating wavelength division multiplexing, is described:

1. FIG. 14 shows a possibility to build a compound building block [900] having the functionality shown in FIG. 14(a) required for the preferred embodiment B as represented in FIG. 4(a). In one direction, a beam [400] is collimated by a lens [320A], reflected by a polarization selective reflector [310] if it has the reflected polarization, and finally focused by a lens [320B]. The direction of the beam can also be inverted, in which case [320B] is the collimating and [320A] the focusing lens.

FIG. 14(b) shows an embodiment based on two building blocks [600A] and [600B] arranged in a configuration as already described in the description of FIG. 9(b). [600A] and [600B] are assembled by bringing together facets [603A] and [604B]. Facet/feature [606A] serves as mechanical stopper for the alignment of the two building blocks relative to each other and may be brought together with a side facet of [600B] formed for example by dicing. Lenses [602A] and [602B] respectively implement the functionality of lenses [320A] and [320B] in FIG. 14(a). The beam [400] is first sent from lens [602A] to facet [603B], that is provided with a surface treatment so as to implement the functionality of polarization selective reflector [310], along axis [607A] of lens [602A], which also forms axis [901A] of the compound building block. If the beam has the reflected polarization, it is then further routed to lens [602B] along its axis [607B], which also forms the axis [901B] of the compound building block. As for FIG. 14(a), the direction of the light can be inverted.

The facet treatment applied to [603B] in FIG. 14(b) can for example be a metal grating. It can also be a thin-film coating, even though in that case, as explained above, it might be difficult to realize a polarization selective reflector [310] at a glass-air interface. For that reason, it may be advantageous to add an additional building block [600C] to reduce the dielectric contrast on both sides of the interface formed by bringing facet [603B] and [603C] together, as already described in the description of FIG. 9(b). Mechanical stops for the alignment of building block [600C] relative to the other two are now given by facet/feature [606B], that may be brought together with facet/feature [605C], facet/feature [605B] that may be brought together with facet/feature [606C], and facet/feature [605A] that may be brought together with a side facet of building block [600C], as formed for example by dicing.

Figure 15:
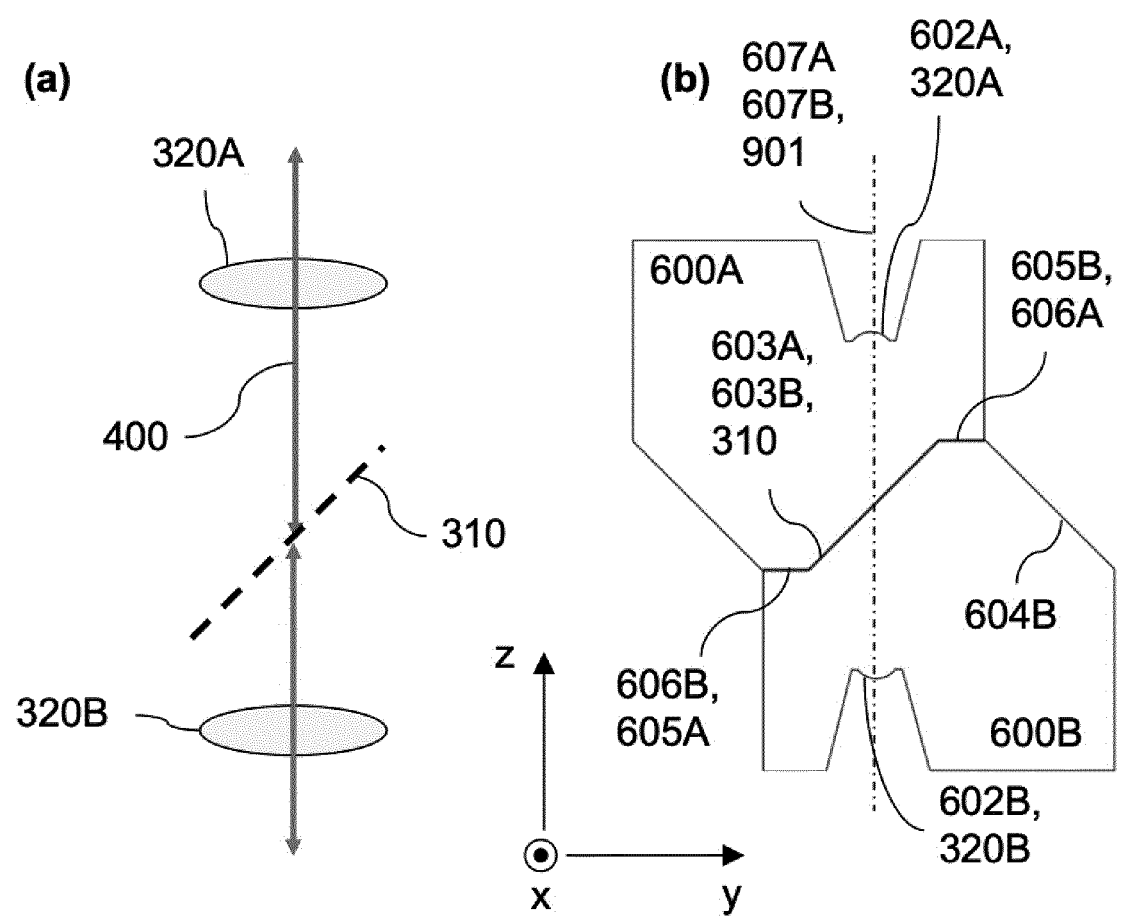
FIG. 15 depicts building a compound building block according to aspects of the disclosure.

2. FIG. 15 shows a possibility to build a compound building block [900] having the functionality shown in FIG. 15(a) required for the preferred embodiment B as represented by FIG. 4(b). In one direction, a beam [400] is collimated by a lens [320A], transmitted by a polarization selective filter [310] if it has the transmitted polarization, and finally focused by a lens [320B]. The direction of the beam can also be inverted, in which case [320B] is the collimating and [320A] the focusing lens.

FIG. 15(b) shows an embodiment based on two building blocks [600A] and [600B] arranged in a configuration as already described in the description of FIG. 9(a). [600A] and [600B] are assembled by bringing together facets [603A] and [603B]. Facets/features [605A] and [606A] serve as mechanical stoppers for the alignment of the two building blocks relative to each other, and may respectively be brought together with facets/features [606B] and [605B]. Lenses [602A] and [602B] respectively implement the functionality of lenses [320A] and [320B] in FIG. 15(a). The beam [400] is first sent from lens [602A] to facets [603A], [603B], one or both of which are provided with a surface treatment so as to implement the functionality of polarization selective filter [310], along axis [607A] of lens [602A], which coincides with axis [607B] of lens [602B] and also forms axis [901] of the compound building block. If the beam has the transmitted polarization, it is then further routed to lens [602B] along the axis [901]. As previously, the direction of the light can be inverted.

Figure 16:
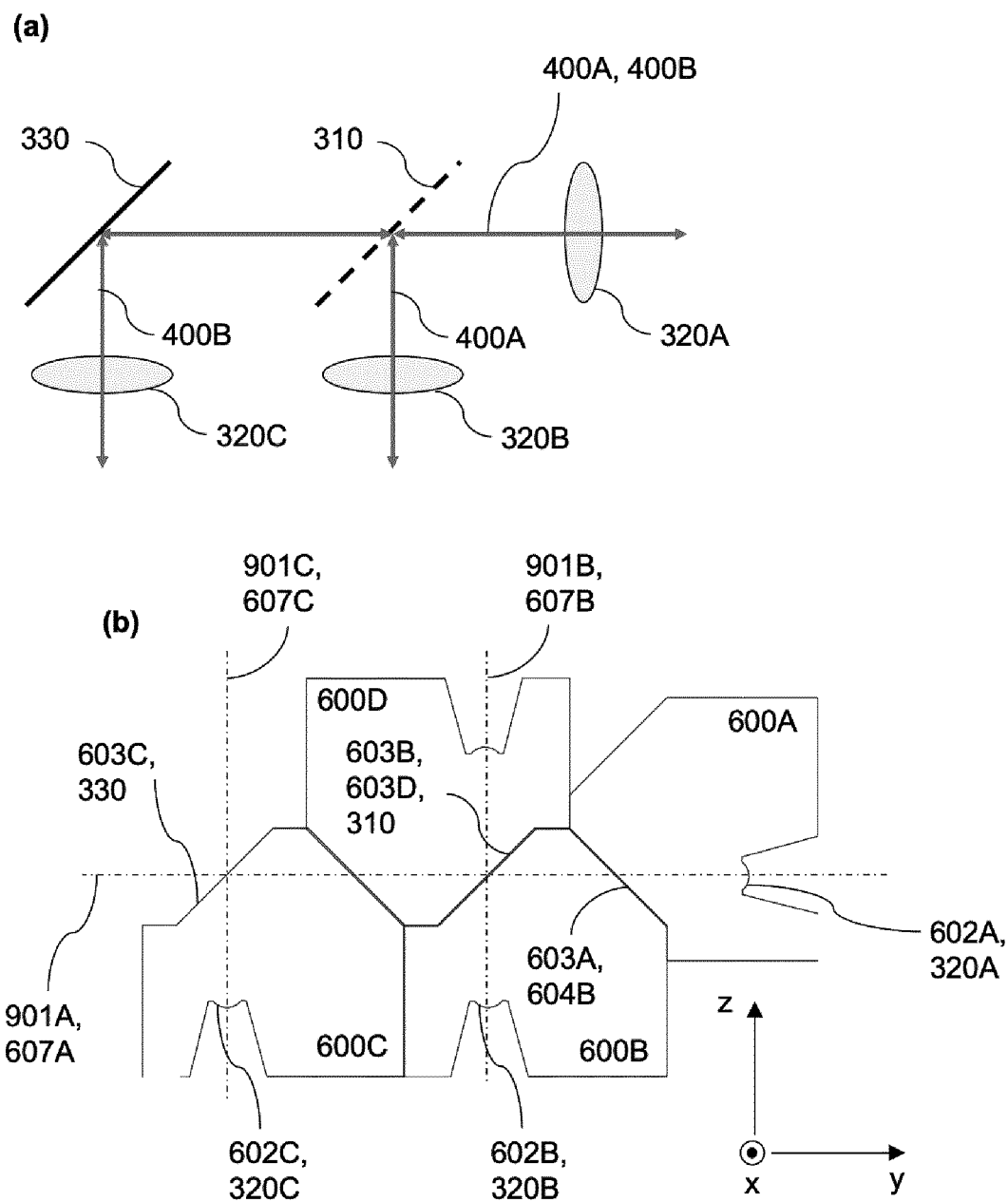
FIG. 16 depicts building a compound interposer according to aspects of the disclosure.

3. FIG. 16 shows a possibility to build a compound interposer [900] having the functionality shown in FIG. 16(a) required for the preferred embodiments A and C as represented by FIGS. 3(a) and 5. In one direction, beams [400A] and [400B], that have orthogonal polarizations, are collimated by a lens [320A] and sent to a polarization selective reflector [310]. Beam [400A], with one polarization, is reflected to lens [320B] and refocused. Beam [400B], with the other polarization, is transmitted to reflector [330], which further reflects it to lens [320C]. It is then also refocused. As for the previous embodiments, the direction of propagation of the light can be inverted.

FIG. 16(b) shows an embodiment based on four building blocks [600A] to [600D] arranged in a configuration as already described in the description of FIG. 9(d). The assembly of building blocks [600A], [600B] and [600D] benefits from mechanical stoppers guiding the alignment of the building blocks relative to each other in a similar manner as building blocks [600A], [600B] and [600C] in FIG. 14(c), where [600C] takes the same position as [600D] here. In FIG. 16(b), [600C] is attached so as to bring [604C] and [604D] together, wherein a side of [600B], for example formed by dicing, can act as a mechanical stopper by forming a mechanical contact to a side of [600C]. Alternatively, [600C] and [600B] can be handled as two attached building blocks [600] that have not been diced from each other. This method is preferred as it facilitates handling and assembly, as one less piece has to be assembled when building the compound building block [900]. Lenses [320A], [320B] and [320C] are respectively embodied by lenses [602A], [602B] and [602C]. Facets [603B] and [603D] are brought together and form polarization selective reflector [310], wherein one or both of [603B] and [603D] may be provided with the appropriate surface treatment(s). Facet [603C] forms reflector [330] and may be left uncoated as total internal reflection may be sufficient to obtain the required reflection (for a high enough glass index). A coating such as a thin-film coating or a metal coating, even if not required, helps however to make the interposer robust to dust, as the light then does not reach the outer surface on which dust might deposit.

Figure 17:
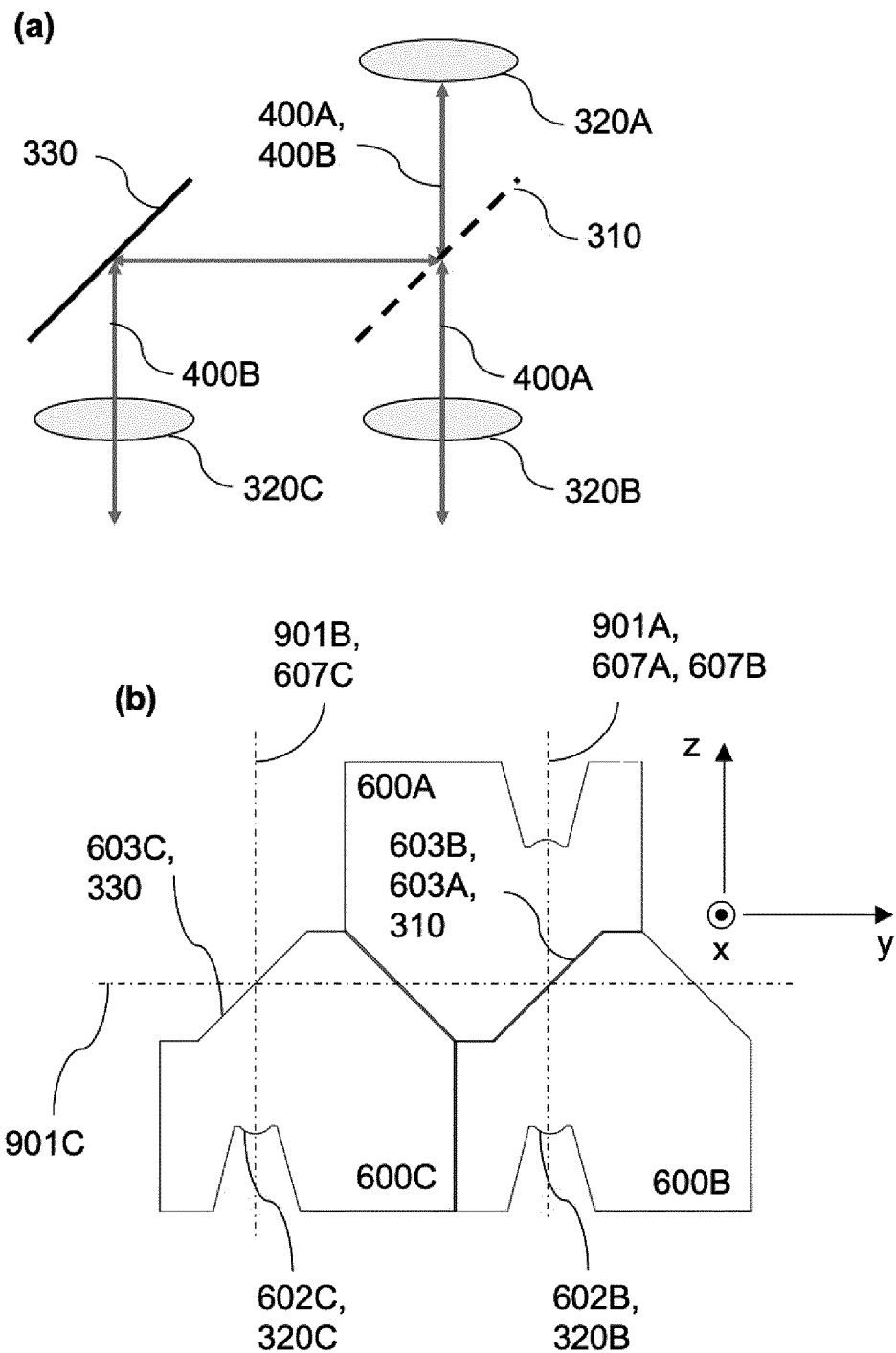
FIG. 17 depicts light coupled in or out of a lens from the top and not form the side of an interposer according to aspects of the disclosure.
Figure 18:
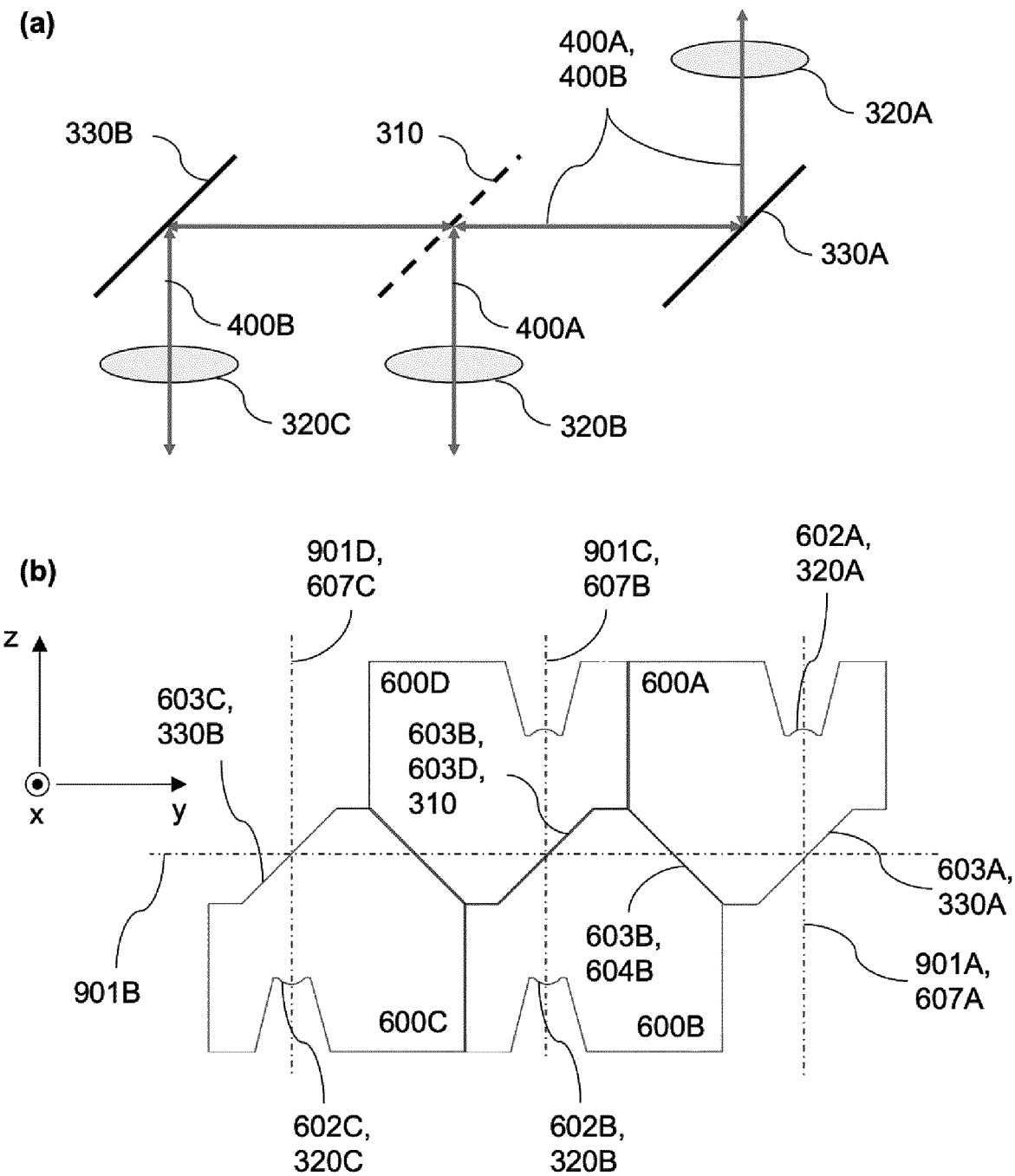
FIG. 18 depicts light coupled in or out of a lens from the top and not form the side of an interposer according to aspects of the disclosure.

4. FIGS. 17 and 18 form further variants for the implementation of embodiments A and C, in which light is coupled in or out of lens [320A] from the top and not from the side of the interposer. More specifically, FIG. 17(b) is a possibility to implement the interposer shown in FIGS. 3(b) and 3(c), while FIG. 18(b) is a possibility to implement a further variant of embodiments A and C. These compound building blocks are formed by several building blocks [600] arranged as in the description of FIG. 9(c). The correspondence between functional elements of FIGS. 17(a) and 18(a) with structural elements of FIGS. 17(b) and 18(b) are indicated by common labeling. Similar aspects as those described for polarization selective reflectors [310] at internal facets or reflectors [330] at external facets apply here as described for FIG. 16. Similarly to FIG. 16, building blocks [600B] and [600C] in FIGS. 17 and 18 and building blocks [600A] and [600D] in FIG. 18 may be handled as groups of non-singulated building blocks [600] to facilitate assembly and handling.

5. FIG. 19 shows an extension of FIG. 16 in which four additional building blocks are added to create 2 additional internal reflective facets. Moreover, here polarization selective reflectors [310] are replaced by wavelength selective reflectors [340] to implement a wavelength division multiplexer/demultiplexer.

In more details, FIG. 19(a) describes the functionality of the compound building block [900] shown in FIG. 19(b). In one direction of propagation, beams [400A]-[400D], having each a different wavelength, enter the compound building block [900] via lens [320A] and are first collimated by this lens and sent to a first wavelength selective reflector [340A]. According to their wavelength and to the wavelength selectivity of reflector [340A], beam [400A] is reflected, sent to lens [320B] and focused, while beams [400B]-[400D] are transmitted and sent to the second wavelength selective reflector [340B]. According to their wavelength and to the modified wavelength selectivity of [340B], beam [400B] is reflected, sent to lens [320C] and focused, while beams [400C], [400D] are transmitted and sent to the third wavelength selective reflector [340C]. According to their wavelength and to the further modified wavelength selectivity of [340C], beam [400C] is reflected, sent to lens [320D] and refocused, while beam [400D] is transmitted and sent to reflector [330]. There, it is reflected to lens [320E] and refocused. Different wavelength selectivities may for example be achieved with thin-film coatings of different composition or layer thicknesses.

The correspondence between functional elements of FIG. 19(a) with structural elements of FIG. 19(b) are indicated by common labeling. Similar aspects as those described for polarization selective reflectors [310] at internal facets or reflectors [330] at external facets apply here as described for FIG. 16, wherein wavelength selectivity may be easier to achieve at inner surfaces. Similarly to FIG. 16, building blocks [600B]-[600E] and [600F]-[600H] may be handled as groups of non-singulated building blocks [600] to facilitate assembly and handling.

This serves as an example to show that the manufacturing methods described here can serve to build the optical interposers A-D described above, but can also be applied to further types of optical interposers such as interposers implementing wavelength selective routing.

Figure 21:
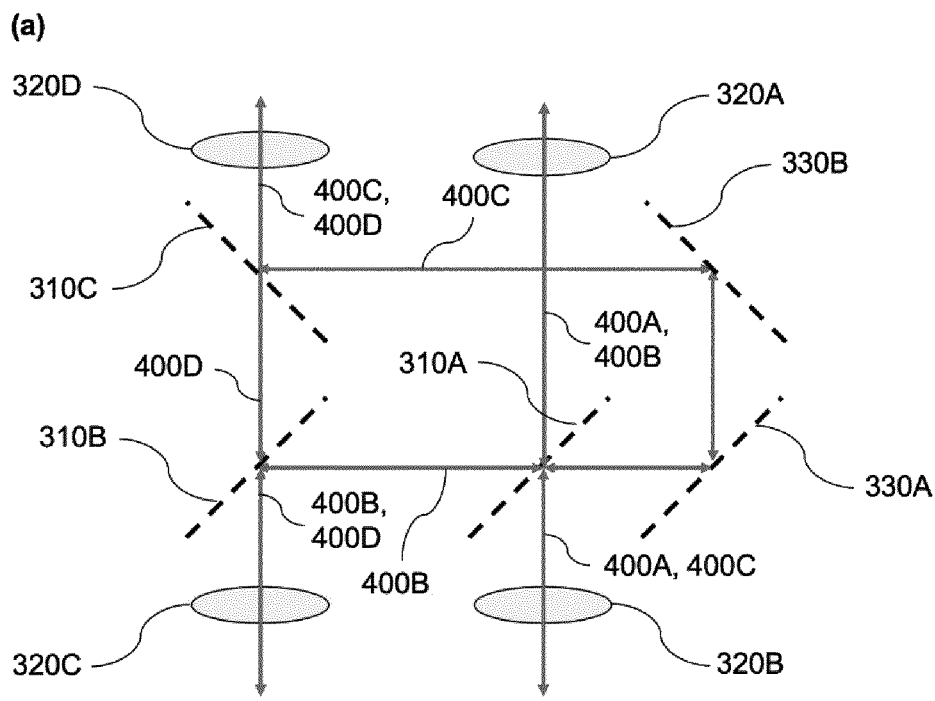
FIG. 21 depicts building a compound building block according to aspects of the disclosure.
Figure 21:
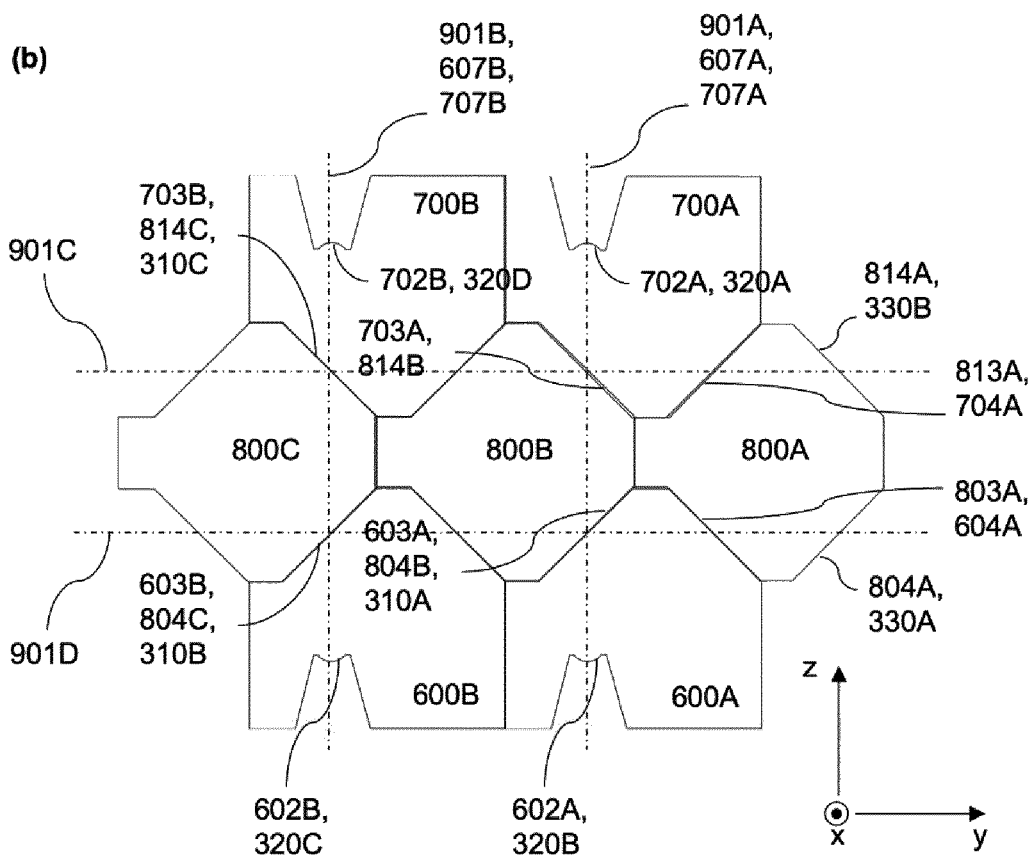

6. FIGS. 20 and 21 show a possibility to build a compound building block [900] having the required properties for the interposer [300] described as preferred embodiment D and shown in FIG. 6. FIG. 20 shows two further types of building blocks, further referred to as the second and third type of building blocks [700] and [800], required for building the compound building block shown in FIG. 21(b). Building block [700] can be implemented as a mirror image of building block [600]. It comprises the same essential features, namely a facet [701] serving as a mechanical contact, a lens [702], optical facets [703] and [704]. In addition, it may also comprise a facet or rounded feature [705] facilitating fabrication by glass molding and/or serving as a mechanical stop for the assembly of compound building blocks, as well as a complementary feature [706]. The lens [702] has an optical axis [707].

The building block [700] is complementary to the building block [600]. In particular, the building block [700] is characterized in that the optical axis [707] of the lens [702] crosses one of the optical facets [703], [704] angled by +45° relative to the optical axis [707], or within +/−20° of that angle, if the optical axis [607] of the lens [602] of building block [600] crosses one of the optical facets [603], [604] angled by −45° relative to the optical axis [607], or within +/−20° of that angle. Furthermore, the building block [700] is characterized in that the optical axis [707] of the lens [702] crosses one of the optical facets [703], [704] angled by −45° relative to the optical axis [707], or within +/−20° of that angle, if the optical axis [607] of the lens [602] of building block [600] crosses one of the optical facets [603], [604] angled by +45° relative to the optical axis [607], or within +/−20° of that angle. Similarly to the first type of building block [600], the second type of building block [700] may also have a recess [708] for inserting an optical element [709]. The second type of building block [700] may consist in another permutation of the first type of building block [600] as described above.

The building block [800] has four optical facets [803], [804], [813], [814]. Furthermore, the building block [800] may have two facets or rounded features [805] and [815] facilitating manufacturing via glass molding and/or serving as mechanical stoppers for the assembly of compound building blocks. In that case, features [606] and [706] of building blocks [600] and [700] might be complementary to features [805] and [815] of building block [800]. Furthermore, building block [800] may have features [806] and [816] that may respectively be complementary to features [605] or [705] of building blocks [600] and [700]. Features [805] and [815] are located where optical facets [803], [804], respectively where optical facets [813], [814], would otherwise merge. Features [806], [816] are located at the basis of optical facets [803] or [804], respectively at the basis of optical facets [813] or [814].

FIG. 21(b) shows a compound building block [900] that can be assembled with building blocks of type [600], [700] and [800] such that the functionality of the compound building block satisfies the requirements for embodiment D of the interposer [300] as illustrated by FIG. 6. The correspondence between structural elements of FIG. 21(b) and functional elements of FIG. 21(a) is indicated by common labeling. The compound building block [900] may be assembled with 2 building blocks [600A], [600B] of type [600], two building blocks [700A] and [700B] of type [700] and three building blocks [800A]-[800C] of type [800]. Building blocks [600A] and [600B], building blocks [700A] and [700B], and building blocks [800A]-[800C] may respectively be handled as groups of 2, 2 and 3 non-singulated building blocks.

As seen in FIG. 21, in order for the building blocks [600], [700] and [800] to be assembled as intended, features of building blocks [600] and [700], as well as features of building blocks [700] and [800], need to be complementary. Specifically, the complementary pairs of features are [605] and [806], [606] and [805], [705] and [816], [706] and [815].

The functionality of embodiment D, as typically required for a transmitted, and of embodiments A or C, as required for example for a receiver, can be obtained together on a common glass interposer [300]. For example, an interposer [300] supporting 4 parallel transmit channels (fibers) and 4 parallel receive channels (fibers) can be built starting with a 2 by 8 array of building blocks [600], that may remain attached to each other. The 2 by 8 array is described as a leftmost 2 by 2 array attached to a rightmost 2 by 2 array. A 3 by 4 array of building blocks [800] can be attached on top of e.g. the leftmost array, followed by a 2 by 2 array of (flipped) building blocks [700] stacked up on top to result in the functionality required for the transmitter (according to FIG. 21). A 1 by 2 array or a 2 by 2 array of (flipped) building blocks [600] can be attached on top of e.g. the rightmost array to result in the functionality required for the receiver (according to FIG. 17 or 18). This transmitter/receiver array can be generalized to other port counts.

As mentioned in the description of the state of the art, one of the main sources of variation between manufactured building blocks [600], [700], [800], as compared to their nominal design, is the control of the distance between the top and bottom molds [1201A] and [1201B] during the molding process. All the implementations shown in FIGS. 14 to 21 have been optimized to minimize the sensitivity of the compound building blocks [900] and of the interposers [300] to this fabrication parameter, i.e., their functionality can be maintained if this parameter is modified. In particular, in building block [600], the mechanical contact facet [601] and the lens [602] can be defined by one mold, while the optical facets [603], [604], the facet or rounded features [605], [606] can be defined by the other mold. The same applies for building block [700]. For building block [800], the optical facets [803], [804] and the facets or rounded features [805], [806] can be defined with one mold, while the optical facets [813], [814] and the facets or rounded features [815], [816] can be defined with the other mold.

Changing the distance between the top and bottom molds [1201A], [1201B] in any of the building blocks [600], [700], [800] does not prevent the assembly schemes as shown in any of the FIGS. 9, 10, 14-19, 21, and does not change at which point of optical facets [603], [604], [703], [704], [803], [804], [813], [814] any of the optical axes [607], [707], [901] cross said optical facets. As a consequence, given that optical axes are preferentially normal or parallel to the orientation of the mechanical contact facets [601], [701] and are preferentially angled+/−45° relative to the normal of optical facets [603], [604], [703], [704], [803], [804], [813], [814], beams reach lenses [602], [702] at the same points and with the same angles irrespectively of deviations in the height of the building blocks as given by the spacing between the two molds. Thus, the designs are insensitive to the main source of manufacturing variation, making them more straightforward and cost-effective to produce.

This is primarily enabled by the fact that light that propagates from building block elements formed by the top mold to building block elements formed by the bottom mold does so along a direction substantially parallel to the surface normal of the mechanical contact facets/attachment interfaces [601], [701] for building blocks [600] and [700], and substantially parallel to the surface normal of the unmolded glass-wafer surface for all three types of building blocks. Respectively, light that propagates from building block elements formed by the top mold to building block elements formed by the bottom mold does so along a direction substantially parallel to the direction in which the press is actuated (the direction in which the top and bottom mold are pressed together during the molding process, i.e., the directions of compression [1202A] and [1202B]), for all building blocks. Substantially parallel might mean here within an angle of +/−20°, or within a smaller angle of +/−10° or +/−5° for increased tolerance to height variation/better performance under manufacturing variance. The directions of compression [1202A] and [1202B] are typically opposite, but parallel to each other.

Figure 22:
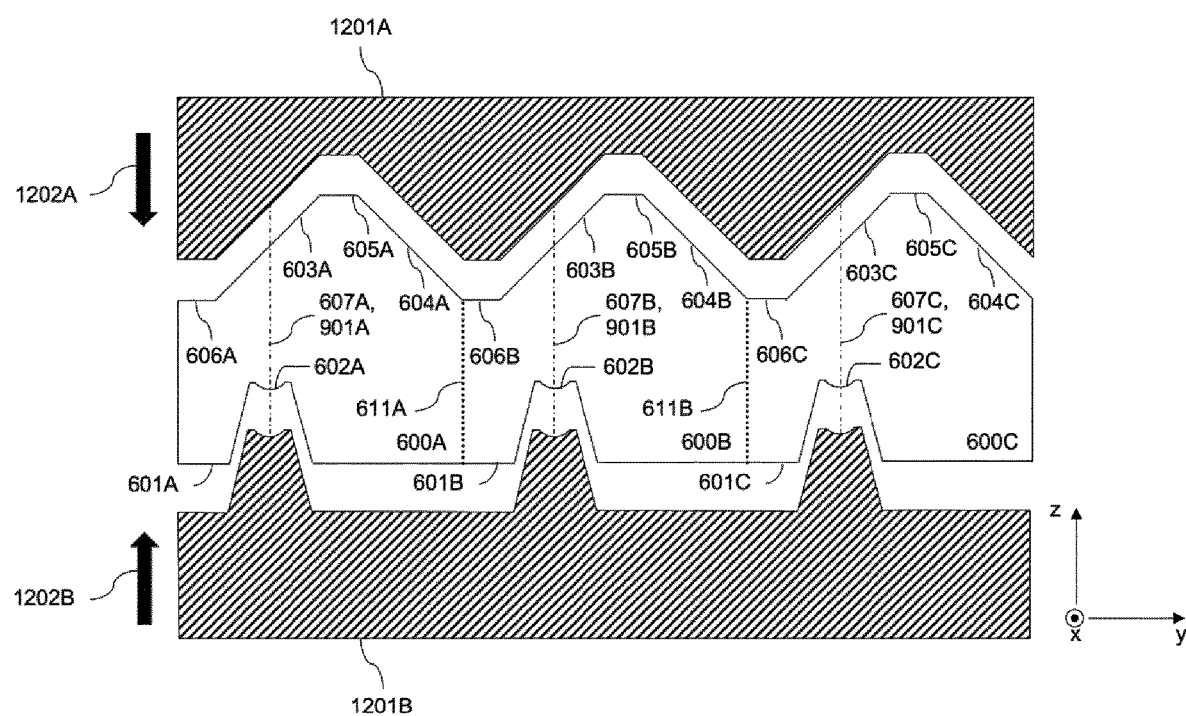
FIG. 22 depicts three building blocks formed by pressing together a top mold and a bottom mold along directions of compression according to aspects of the disclosure.

This is illustrated in FIG. 22 in which three building blocks [600A], [600B], [600C] are formed by pressing together top mold [1201A] and bottom mold [1201B] along directions of compression [1202A] and [1202B]. The three building blocks can be later singulated by dicing the molded glass wafer along cut-lines [611A] and [611B]. It can be seen that optical facets [603A]-[603C], [604A]-[604C] and facets/features [605A]-[605C], [606A]-[606C] are formed by the top mold [1201A] while mechanical contact facets/attachment interfaces [601A]-[601C] as well as lenses [602A]-[602C] are formed by the bottom mold [1201B]. The building blocks have optical axes [901A]-[901C] that may coincide with optical axes of lenses, for example optical axes [607A]-[607C] of lenses [602A]-[602C]. The optical axes [901A]-[901C] are followed by light beams [400] in the manufactured parts and connect optical elements formed by the bottom mold [1201B] to optical elements formed by the top mold [1201A], here the lenses [602A]-[602C] and the optical facets [603A]-[603C]. Importantly, the optical axes [901A]-[901C] are parallel to the directions of compression [1202A], [1202B] or within an angular tolerance as described above.

| | Label reference list |
|---|---|
| 100: | PIC |
| 110: | Polarization selective coupler |
| 110A: | First polarization selective coupler |
| 110B: | Second polarization selective coupler |
| 111: | Single mode, single polarization VCSEL |
| 112: | Single polarization grating coupler |
| 112A: | First single polarization grating coupler |
| 112B: | Second single polarization grating coupler |
| 113: | Edge coupler |
| 113A: | First edge coupler |
| 113B: | Second edge coupler |
| 120: | Waveguide |
| 120A: | First waveguide |
| 120B: | Second waveguide |
| 130: | Polarization selective element |
| 130A: | First polarization selective element |
| 130B: | Second polarization selective element |
| 131: | Waveguide corrugation |
| 131A: | First waveguide corrugation |
| 131B: | Second waveguide corrugation |
| 132: | Thin film coating |
| 132A: | First thin film coating |
| 132B: | Second thin film coating |
| 140: | Photonic sub-circuit |
| 141: | Optical port |
| 141A: | First optical port |
| 141B: | Second optical port |
| 150: | Photonic, electro-optic or optoelectronic device |
| 151: | Bi-directional electro-optic modulator |
| 160: | Cut-line |
| 170: | Dual-polarization couplers |
| 170A: | First dual-polarization coupler |
| 170B: | Second dual-polarization coupler |
| 200, 200A: | Second optical element |
| 200B: | Third optical element |
| 201: | Glass fiber |
| 300: | Glass/optical interposer |
| 310: | Polarization selective reflector or filter |
| 310A: | First polarization selective reflector or filter |
| 310B: | Second polarization selective reflector or filter |
| 310C: | Third polarization selective reflector or filter |
| 320: | Lens |
| 320A: | First lens |
| 320B: | Second lens |

-continued

| Label reference list | |
|---|---|
| 320C: | Third lens |
| 320D: | Fourth lens |
| 330: | Reflector |
| 330A: | Fourth reflector |
| 330B: | Fifth reflector |
| 340: | Wavelength selective reflector |
| 400: | Light beam |
| 400A: | First light beam |
| 400B: | Second light beam |
| 400C: | Third light beam |
| 400D: | Fourth light beam |
| 500: | Faraday rotator |
| 500A: | First Faraday rotator |
| 500B: | Second Faraday rotator |
| 600: | Building block/building block of first type |
| 601: | Facet, mechanical contact/attachment interface |
| 602: | Lens |
| 603, 604: | Optical facets |
| 605: | Facet or rounded feature preventing sharp cusp |
| 606: | Complementary feature to 605 |
| 607: | Optical axis of lens |
| 608: | Recess for inserting optical element |
| 609: | Inserted optical element |
| 610: | Additional facet |
| 611: | Cut-line |
| 700: | Building block of second type |
| 701: | Facet, mechanical contact/attachment interface |
| 702: | Lens |
| 703, 704: | Optical facets |
| 705: | Facet or rounded feature preventing sharp cusp |
| 706: | Complementary feature to 705 |
| 707: | Optical axis of lens |
| 708: | Recess for inserting optical element |
| 709: | Inserted optical element |
| 800: | Building block of third type |
| 803, 804: | Optical facets |
| 805: | Facet or rounded feature preventing sharp cusp, complementary feature to 606 |
| 806: | Facet or rounded feature preventing sharp cusp, complementary feature to 605 |
| 813, 814: | Optical facets |
| 815: | Facet or rounded feature preventing sharp cusp, complementary feature to 706 |
| 816: | Facet or rounded feature preventing sharp cusp, complementary feature to 705 |
| 900: | Composite building block |
| 901: | Optical axis |
| 902: | Void |
| 1000: | Glass-wafer, preform |
| 1001: | 1D or 2D array of molded building blocks |
| 1002: | Spacer |
| 1100: | Building block (of any type) |
| 1101: | Facet, mechanical contact/attachment interface |
| 1102: | Lens |
| 1103: | Optical facet |
| 1107: | Optical axis of lens |
| 1201A: | Top mold |
| 1201B: | Bottom mold |
| 1202A: | Direction of compression for top mold |
| 1202B: | Direction of compression for bottom mold |

The invention claimed is:

1. An optical interposer apparatus comprising:
a first, second, and third lens and a first polarization selective reflector coupling light from a second optical element to a photonic integrated circuit or from a photonic integrated circuit to a second optical element, the photonic integrated circuit comprising a first polarization selective coupler or a first coupler connected to a polarization selective subsystem and a second polarization selective coupler or a second coupler connected to a polarization selective subsystem, wherein:
light propagates from the second optical element to the first lens, from the first lens to the first polarization selective reflector, from the first polarization selective reflector to the second lens or to the third lens according to its polarization, from the second lens to the first coupler or from the third lens to the second coupler, or in the reverse order; and
light is coupled from the second optical element to the first coupler for one polarization and coupled to the second coupler for another polarization;
light is coupled from the first coupler into the second optical element with one polarization and coupled from the second coupler into the second optical element with another polarization;
light is coupled from the second optical element to the first coupler and the second optical element is isolated from reflections occurring at or after the first coupler; or
light is coupled from the first coupler to the second optical element and the photonic integrated circuit is isolated from reflections occurring at or after the second optical element.

2. The apparatus of claim 1, wherein a first Faraday rotator is interposed between the second lens and the first coupler, wherein:
light is coupled from the second optical element to the first coupler and the second optical element is isolated from reflection occurring at or after the first coupler; or
light is coupled from the first coupler to the second optical element and the photonic integrated circuit is isolated from reflections occurring at or after the second optical element.

3. The apparatus of claim 1, wherein a first Faraday rotator is interposed between the second lens and the first coupler and a second Faraday rotator is interposed between the third lens and the second coupler, wherein:
light propagates from the second optical element to the first lens, from the first lens to the first polarization selective reflector, from the first polarization selective reflector to the second lens or to the third lens according to its polarization, from the second lens to the first Faraday rotator, from the first Faraday rotator to the first coupler or from the third lens to the second Faraday rotator, from the second Faraday rotator to the second coupler, or in the reverse order; and light is coupled from the second optical element to the first coupler for one polarization and from the second optical element to the second coupler for another polarization and the second optical element is isolated from reflections occurring at or after the first and second couplers; or light is coupled from the first coupler to the second optical element with one polarization and from the second coupler to the second optical element with another polarization and the photonic integrated circuit is isolated from reflections occurring at or after the second optical element.

4. The apparatus of claim 1, wherein the photonic integrated circuit comprises a photonic sub-circuit with a first and a second optical port and the apparatus comprises at least a first Faraday rotator, wherein:
the first optical port is connected to the first polarization selective coupler and the second optical port is connected to the second polarization selective coupler;
at least some of the light entering the photonic sub-circuit via the first optical port exits the photonic sub-circuit via the second optical port and vice-versa;
light emitted by the second optical element is coupled to the photonic integrated circuit via one of the couplers according to its polarization; and
light emitted by the photonic integrated circuit via one of the couplers is coupled to a third optical element.

5. The apparatus of claim 4, further comprising a fourth lens and a second and third polarization selective reflector, wherein the first Faraday rotator is interposed between the second lens and the first coupler, and a second Faraday rotator is interposed between the third lens and the second coupler.

6. The apparatus of claim 5, wherein light propagates from the second optical element to the first lens, from the first lens to the first polarization selective reflector, from the first polarization selective reflector to the second lens or to the second polarization selective reflector depending on its polarization, from the second lens to the first Faraday rotator, from the first Faraday rotator to the first coupler, from the second polarization selective reflector to the third lens, from the third lens to the second Faraday rotator, and from the second Faraday rotator to the second coupler, or in reverse order.

7. The apparatus of claim 6, wherein at least one of:
light emitted by the photonic integrated circuit via first coupler propagates to the first Faraday rotator, from the first Faraday rotator to the second lens, from the second lens to the first polarization selective reflector, from the first polarization selective reflector to the third polarization selective reflector, from the third polarization selective reflector to the fourth lens, from the fourth lens to the third optical element, or in reverse order; or
light emitted by the photonic integrated circuit via the second coupler propagates to the second Faraday rotator, from the second Faraday rotator to the third lens, from the third lens to the second polarization selective reflector, from the second polarization selective reflector to the third polarization selective reflector, from the third polarization selective reflector to the fourth lens, from the fourth lens to the third optical element, or in reverse order.

8. The apparatus of claim 5, wherein:
the first polarization selective reflector, together with first Faraday rotator, forms a circulator;
the second polarization selective reflector, together with second Faraday rotator, forms a circulator; and the first polarization selective reflector splits light incoming from the second optical element according to its polarization before incoming light being coupled to the photonic integrated circuit and the third polarization selective reflector combines light of different polarization returning from the photonic integrated circuit before returning light being coupled to the third optical element; or the third polarization selective reflector splits light incoming from the second optical element according to its polarization before incoming light being coupled to the photonic integrated circuit and the first polarization selective reflector combines light of different polarization returning from the photonic integrated circuit before returning light being coupled to the third optical element.

9. The apparatus of claim 1, wherein the first and second couplers are surface emitting/receiving couplers oriented orthogonally to each other.

10. The apparatus of claim 1, wherein the first and second couplers are surface emitting/receiving couplers oriented parallel or antiparallel to each other.

11. An optical interposer apparatus comprising:
a first and second lens and a first polarization selective reflector or filter coupling light from a second optical element to a photonic integrated circuit or from a photonic integrated circuit to a second optical element, the photonic integrated circuit comprising a first and second coupler, a first and second polarization selective element adapted to transmit different polarizations, wherein the first and second couplers are edge couplers and respectively connected with the first and second polarization selective elements, wherein:
light propagates from the second optical element to the first lens, from the first lens to the first polarization selective reflector or filter, from the first polarization selective reflector or filter to the second lens, from the second lens to the first coupler, or in the reverse order; and
light is coupled from the second optical element to the first coupler for one polarization and coupled to the second coupler for another polarization;
light is coupled from the first coupler into the second optical element with one polarization and coupled from the second coupler into the second optical element with another polarization;
light is coupled from the second optical element to the first coupler and the second optical element is isolated from reflections occurring at or after the first coupler; or
light is coupled from the first coupler to the second optical element and the photonic integrated circuit is isolated from reflections occurring at or after the second optical element.

12. An optical interposer apparatus comprising:
a first and second lens and a first polarization selective reflector or filter coupling light from a second optical element to a photonic integrated circuit or from a photonic integrated circuit to a second optical element, the photonic integrated circuit comprising a first polarization selective coupler or a first coupler connected to a polarization selective subsystem, wherein:
a free beam propagates inside the optical interposer and is not constrained by guiding in a waveguide, the free beam is collimated or near-collimated, a distribution of k-vectors of the free beam are substantially narrower than that of beams emitted or received by the second optical element and the first polarization selective coupler or the first coupler connected to a polarization selective subsystem, the free beam reaches the first polarization selective reflector or filter;

light propagates from the second optical element to the first lens, from the first lens to the first polarization selective reflector or filter, from the first polarization selective reflector or filter to the second lens, from the second lens to the first coupler, or in the reverse order; and light is coupled from the second optical element to the first coupler for one polarization and coupled to a second coupler of the photonic integrated circuit for another polarization;

light is coupled from the first coupler into the second optical element with one polarization and coupled from a second coupler of the photonic integrated circuit into the second optical element with another polarization;

light is coupled from the second optical element to the first coupler and the second optical element is isolated from reflections occurring at or after the first coupler; or light is coupled from the first coupler to the second optical element and the photonic integrated circuit is isolated from reflections occurring at or after the second optical element.

13. The apparatus of claim 12, wherein part of the optical interposer is formed by molding with a top and with a bottom mold pressed together during the molding process, and wherein the free beam propagates from an element formed by the top mold to an element formed by the bottom mold along a direction of propagation, wherein the direction of propagation is parallel to the directions in which the top and bottom molds have been pressed together or within +/−20° of that direction.

* * * * *